United States Patent
Baron

(10) Patent No.: US 8,740,235 B2
(45) Date of Patent: Jun. 3, 2014

(54) VEHICLE WITH A SHOCK ABSORBER

(71) Applicant: Yoram Baron, Moshave Nir (IL)

(72) Inventor: Yoram Baron, Moshave Nir (IL)

(73) Assignee: Smart Trike MNF PTE Ltd, Park Mall (SG)

( * ) Notice: Subject to any disclaimer, the term of this patent is extended or adjusted under 35 U.S.C. 154(b) by 0 days.

(21) Appl. No.: 14/100,677

(22) Filed: Dec. 9, 2013

(65) Prior Publication Data

US 2014/0091550 A1     Apr. 3, 2014

Related U.S. Application Data

(63) Continuation of application No. 13/946,554, filed on Jul. 19, 2013, now Pat. No. 8,602,432, which is a continuation of application No. 13/919,389, filed on Jun. 17, 2013, which is a continuation of application No. 13/569,582, filed on Aug. 8, 2012, now Pat. No. 8,465,037.

(60) Provisional application No. 61/523,215, filed on Aug. 12, 2011.

(51) Int. Cl.
| | |
|---|---|
| *B62K 21/14* | (2006.01) |
| *B62K 21/02* | (2006.01) |
| *B62K 21/18* | (2006.01) |
| *B62K 25/06* | (2006.01) |
| *B62K 25/08* | (2006.01) |

(52) U.S. Cl.
USPC ........... 280/240; 280/621; 280/622; 280/623; 280/624; 280/625; 280/626; 280/627; 280/628; 280/629; 280/124.1; 280/282; 280/259

(58) Field of Classification Search
CPC ........ B62K 21/02; B62K 21/14; B62K 21/18; B62K 25/06; B62K 25/08
USPC ........................................ 280/240, 282, 259
See application file for complete search history.

(56) References Cited

U.S. PATENT DOCUMENTS

| | | | |
|---|---|---|---|
| 2,202,479 A | 5/1940 | Bullock | |
| 2,672,351 A | 3/1954 | Kane | |
| 3,190,676 A * | 6/1965 | Junge | 280/273 |
| 3,485,507 A | 12/1969 | Christof | |
| 3,863,472 A | 2/1975 | Klingfus | |
| 4,714,261 A | 12/1987 | Kassai | |
| 5,011,133 A | 4/1991 | Myers, Sr. | |

(Continued)

FOREIGN PATENT DOCUMENTS

| | | |
|---|---|---|
| CN | 101691130 A | 4/2010 |
| CN | 201825196 U | 5/2011 |

(Continued)

*Primary Examiner* — Hau Phan
*Assistant Examiner* — Bryan Evans
(74) *Attorney, Agent, or Firm* — Finnegan, Henderson, Farabow, Garrett & Dunner, LLP

(57) ABSTRACT

A tricycle may be operable between a first mode of operation steerable by a tricycle rider, and a second mode of operation steerable by an individual pushing the tricycle. In both such first and second modes, the frame of the tricycle is configured to rotatably support the rear wheels and configured to support the head tube at a distance from the rear wheels such that a distance between the head tube and rear wheels need not necessarily be changed even when the front wheel axis location is changed from one mode to another.

11 Claims, 36 Drawing Sheets

(56) References Cited

U.S. PATENT DOCUMENTS

| | | |
|---|---|---|
| 5,028,066 A | 7/1991 | Garth |
| 5,085,063 A | 2/1992 | Van Dyke et al. |
| 5,499,834 A | 3/1996 | Pasin et al. |
| 6,082,754 A | 7/2000 | Jeunet et al. |
| 6,120,048 A | 9/2000 | Li |
| 6,149,178 A | 11/2000 | Bradbury et al. |
| 6,302,421 B1 | 10/2001 | Lee |
| 6,343,806 B1 | 2/2002 | Lee |
| 6,378,884 B1 | 4/2002 | Kettler |
| 6,443,469 B1 | 9/2002 | Cross et al. |
| 6,530,589 B1 | 3/2003 | Ma |
| 6,612,598 B2 | 9/2003 | Wu |
| 6,666,470 B2 | 12/2003 | Li |
| 6,685,207 B1 | 2/2004 | Blake |
| 6,688,633 B2 | 2/2004 | van't Schip |
| 6,799,772 B2 | 10/2004 | Kettler et al. |
| 6,811,172 B2 | 11/2004 | Yen |
| 6,811,173 B1 | 11/2004 | Shih |
| 6,840,527 B1 | 1/2005 | Michelau et al. |
| 6,874,802 B2 | 4/2005 | Gunter et al. |
| 6,908,091 B2 | 6/2005 | Chuang |
| 7,000,935 B2 | 2/2006 | Gunter et al. |
| 7,044,491 B2 | 5/2006 | Kettler |
| 7,246,809 B2 * | 7/2007 | Rutkowski .................. 280/259 |
| 7,281,725 B1 | 10/2007 | Gunter et al. |
| 7,347,071 B2 | 3/2008 | Nakai et al. |
| 7,614,633 B2 | 11/2009 | Göring |
| 2002/0089144 A1 | 7/2002 | Kettler |
| 2003/0014169 A1 | 1/2003 | Kato et al. |
| 2003/0201621 A1 | 10/2003 | Jang |
| 2004/0164515 A1 | 8/2004 | Gunter et al. |
| 2011/0074125 A1 | 3/2011 | Aiken et al. |
| 2011/0278815 A1 | 11/2011 | Khare et al. |

FOREIGN PATENT DOCUMENTS

| | | |
|---|---|---|
| DE | 29822875 U1 | 6/2000 |
| EP | 0 839 706 | 5/1998 |
| EP | 1 048 559 A1 | 11/2000 |
| FR | 2 187 592 | 1/1974 |
| FR | 2 930 929 | 11/2009 |
| FR | 2955080 A1 | 7/2011 |
| GB | 1 422 409 | 1/1976 |
| JP | 2001-247072 | 9/2001 |
| JP | 2001-315681 | 11/2001 |
| JP | 2006-298161 | 11/2006 |
| NL | 1023930 C2 | 1/2005 |

* cited by examiner

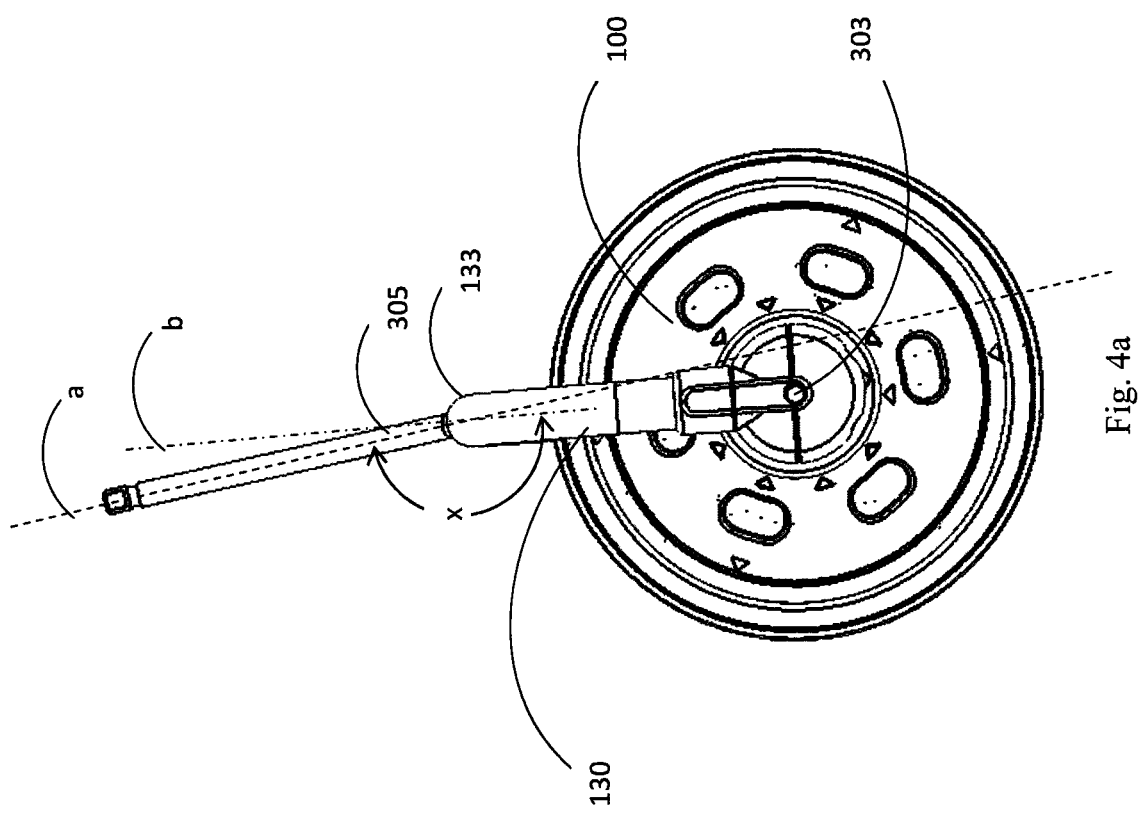

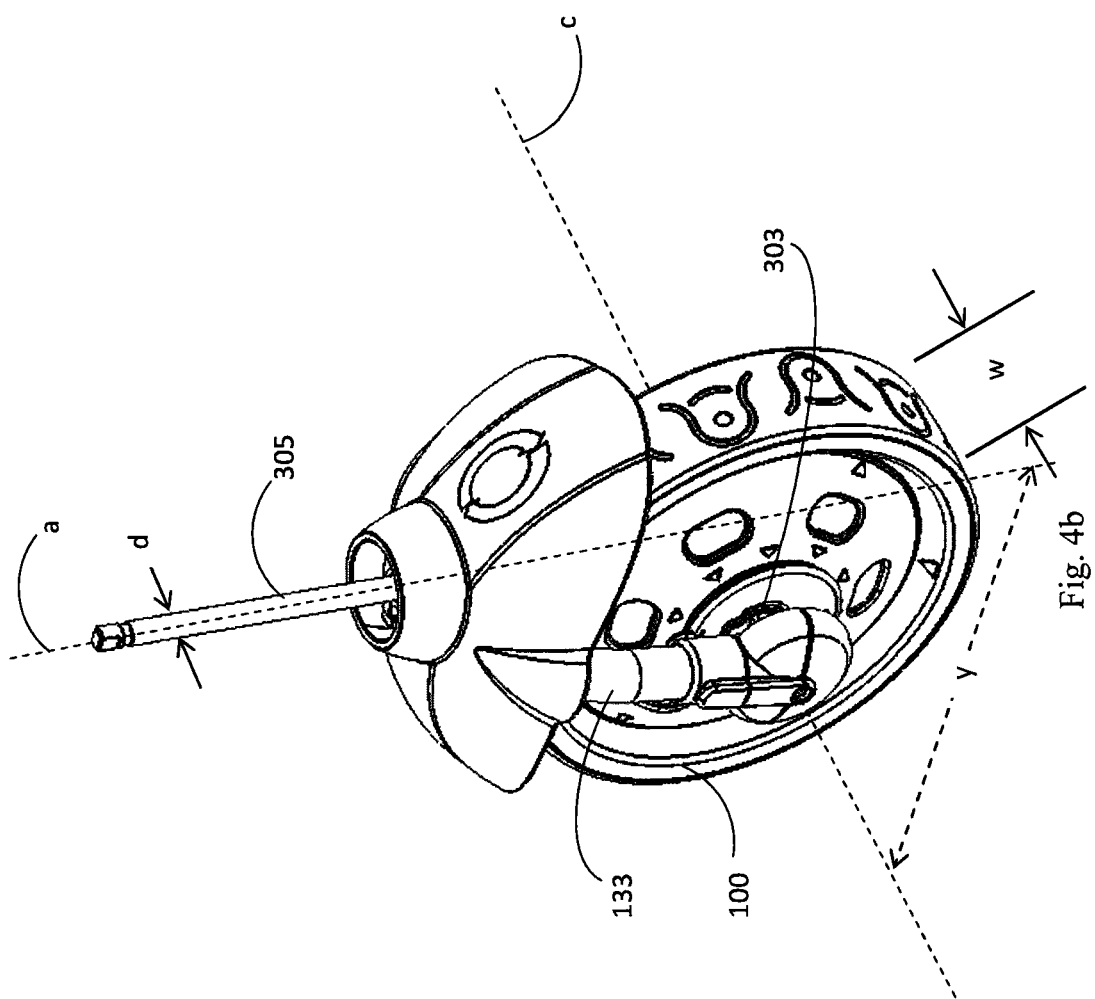

VEHICLE WITH A SHOCK ABSORBER

This application is a continuation of U.S. patent application Ser. No. 13/946,554, filed Jul. 19, 2013, now U.S. Pat. No. 8,602,432, which is a continuation of U.S. patent application Ser. No. 13/919,389, filed Jun. 17, 2013, now pending, which is a continuation of U.S. patent application Ser. No. 13/569,582, filed Aug. 8, 2012, now U.S. Pat. No. 8,465,037, which claims priority to U.S. Provisional Application No. 61/523,215, filed Aug. 12, 2011, the entire contents of each of which are incorporated herein by reference.

TECHNICAL FIELD

The invention generally relates to the field of riding vehicles.

BACKGROUND

Whether used for transportation or recreation, tricycles may be used for riders of different sizes and capabilities. Some tricycles are configured to be propelled and steered by the rider. In some instances, tricycles are configured to be pushed from behind, by an individual, such as an adult pushing a child. Typically, when the tricycle is propelled by the rider, the rider uses the pedals attached to the front wheel and steers the tricycle using a handle which is typically connected to the front wheel. Tricycles configured to be pushed from behind sometimes include a mechanical steering mechanism to permit an adult walking behind the tricycle to mechanically turn the front wheel.

SUMMARY

An exemplary embodiment of the invention may include a tricycle operable between a first mode of operation steerable by a tricycle rider, and a second mode of operation steerable by an individual pushing the tricycle. In both such first and second modes, the frame of the tricycle is configured to rotatably support the rear wheels and configured to support the head tube at a fixed, non-adjustable distance from the rear wheels. That is, the distance between the head tube and the rear wheels need not necessarily be changed even when the front wheel axis location is changed from one mode to another.

More specifically, a tricycle may include a fork having at least one blade configured to support a front wheel in a manner permitting the front wheel to rotate about a front wheel axis. A stem may be configured to rotatably extend from the head tube and a rider handle, may be configured to turn the fork about a stem axis transverse to the front wheel axis, the rider handle, in the first mode, being configured to be rotationally coupled with the stem in a manner permitting a tricycle rider to exert forces on the rider handle and thereby turn the fork, and the rider handle in the second mode, being configured to be rotationally uncoupled from the stem, preventing forces on the rider handle from turning the fork, wherein the stem extends from the fork at an angle chosen so that when the stem axis leads the front wheel axis the pedals do not necessarily interfere with the rider's feet, while turning, without a need to alter a distance between the seat and the head tube, and wherein, in the first mode, the stem extends from the fork at an angle chosen so that when the stem axis trails the front wheel axis the pedals are oriented for pedaling by a rider without a need to alter a distance between the seat and the head tube The handle, in the first mode, may be rotationally coupled with the stem in a manner permitting a tricycle rider to exert forces on the handle and thereby turn the fork. In a second mode, the handle may be rotationally uncoupled from the stem, preventing forces on the handle from turning the fork.

The tricycle may include a pair of rear wheels, a front wheel having opposing sides and a front wheel axis, and a pair of pedals, where each pedal may be configured to rotate the front wheel. The tricycle may include a seat as well.

The foregoing is a summary a few exemplary features of a few embodiments, and is not intended to be restrictive of the invention as hereinafter described and claimed.

BRIEF DESCRIPTION OF THE DRAWINGS

In the drawings:

FIG. 4a is a side view of a front wheel fork and stem assembly consistent with an embodiment of the invention.

FIG. 4b is a perspective view of the front wheel assembly of FIG. 4a with mud guard added.

DETAILED DESCRIPTION

The terms of "front", "rear", "down", "up", "bottom", "upper", "horizontal", "vertical", "right", "left" or any reference to sides or directions are used throughout the description for the sake of brevity alone and are relative terms only and not intended to require a particular component orientation.

Figure 1:
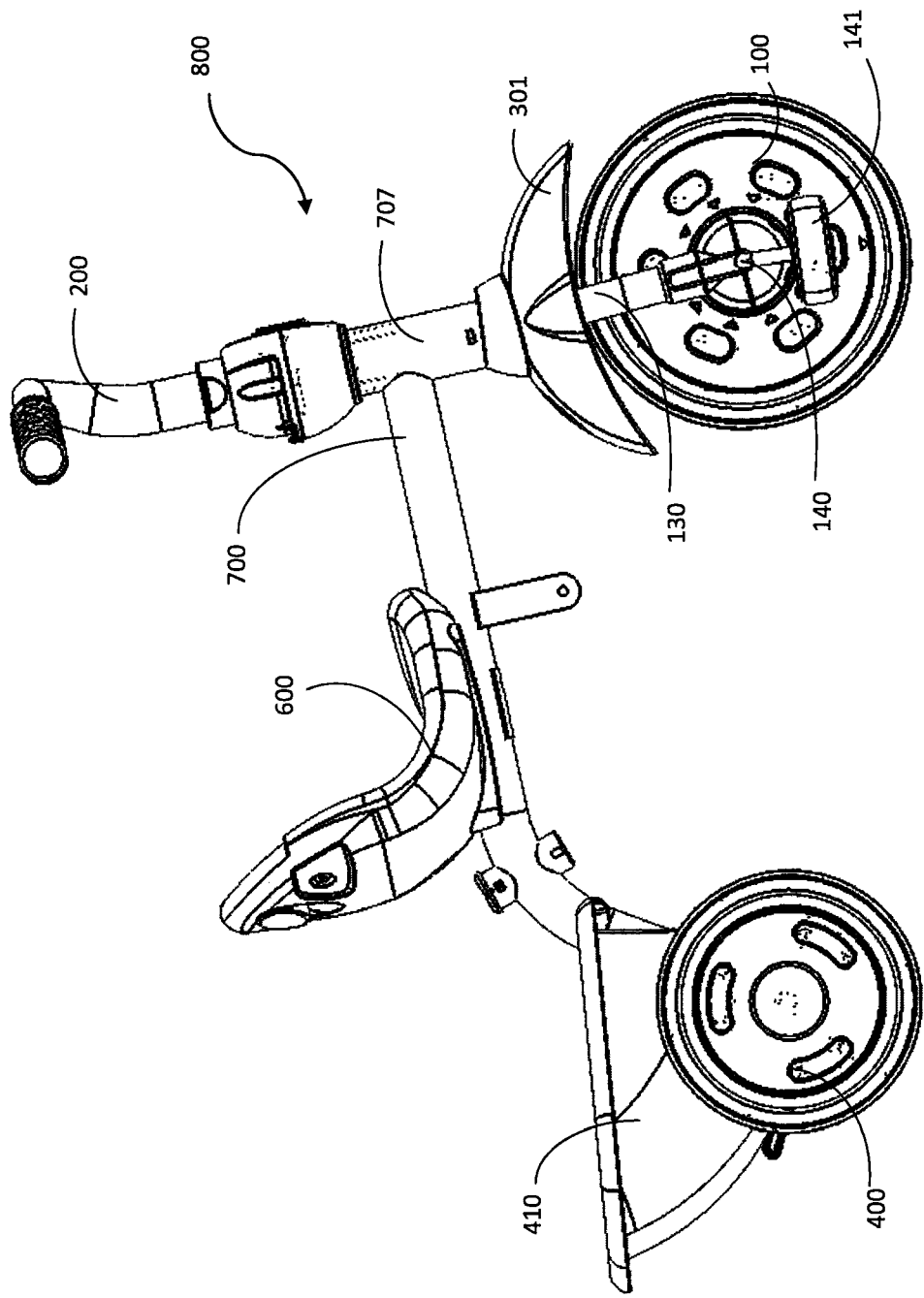
FIG. 1 is a side view of a tricycle, without parental handle, and which may be used in a first mode of operation, according to an embodiment of the invention.
Figure 2:
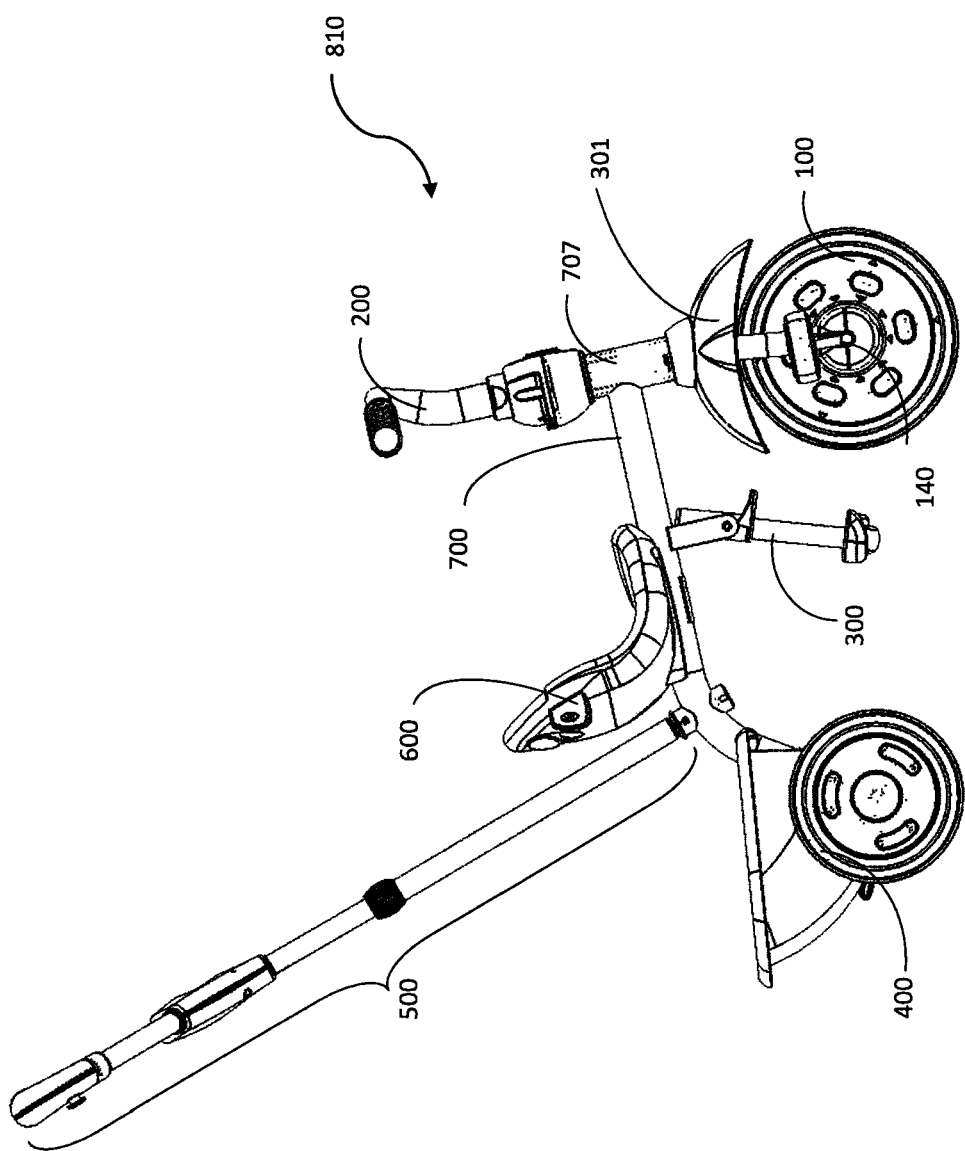
FIG. 2 is a side view of a tricycle, having a parental handle, which may be used in a second mode of operation, according to an embodiment of the invention.

Embodiments of the invention may include a tricycle operable between a first mode of operation steerable by a tricycle rider, and a second mode of operation steerable by an individual pushing the tricycle. A tricycle, as used herein, includes any vehicle with a wheel in the front and two wheels in the rear. FIG. 1, for example, illustrates is a side view of a tricycle, and which can be used in a first mode of operation where a rider may propel the tricycle using pedals 141 and 142 (see FIG. 3). A second mode of operation may be accomplished when an individual behind the tricycle, pushes the tricycle using, for example, parental handle 500, as illustrated in FIG. 2.

Embodiments of the invention may include a tricycle having a frame and a pair of rear wheels for rotatable connection to the frame. As illustrated in FIG. 1, exemplary tricycle 800 may include a main frame 700 including head tube 707. Two rear wheels 400 (see FIG. 3) may be supported toward the rear of the main frame 700. The main frame 700 may be made of any material or have any structure, shape, or configuration capable of supporting a tricycle rider. For example, main frame 700 may include metal tubing or any other rigid material, and may be configured to support a seat 600.

Figure 3:
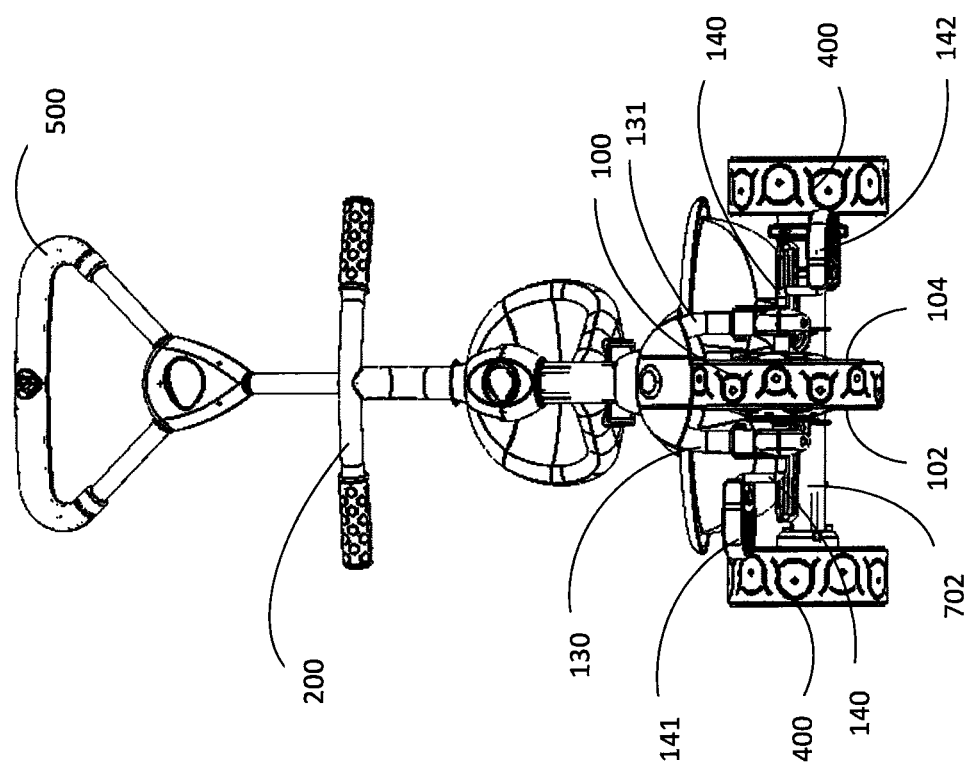
FIG. 3 is front view of the tricycle of FIG. 2.

In one embodiment, the rear wheels 400 may be rotatably supported on a central axle (the support shaft 702 of which is illustrated in FIG. 3) which may be inserted into the rear part of the main frame 700, effectively allowing the rear wheels 400 to rotate frontwards or backwards. A seat 600 may be connected, by any known method, to the main frame 700. The seat may have any configuration capable of supporting a rider. It may include or omit a back rest, may be integrally formed or formed of multiple materials, and/or may be uncovered or covered in cloth, fabric, or other material.

The main frame 700 may also have a number of connection options for seat 600, effectively allowing the placing/adjustment of seat 600 at a number of locations along the main frame 700. In one embodiment, a basket 410 may be added and placed on the rear part of main frame 700 between the rear wheels 400.

FIG. 2 is similar to FIG. 1, adding a parental handle, which may be permanent, semi-permanent (e.g., removable with tools), or designed to be removable at will. The term "parental handle" as used herein, includes any structure, regardless of shape or material that may be grasped by an individual behind a tricycle and used to propel the tricycle from behind. By way of example, parental handle 500 illustrated in FIG. 2, may be made of one or more metal pipes or from any other rigid material. In one embodiment, the parental handle 500 may be telescopically adjustable to accommodate the height of the individual pushing the tricycle 810. The adjustable height mechanism of parental handle 500 may belong to any of the known adjusting techniques such as by a popup pin held within the inner pipe of the handle and which pops out of one of the holes of the outer pipe, where the pin may be pushed from one hole and popped out of a different hole, for adjusting the height of the handle.

Embodiments of the invention may also include a front wheel having opposing sides and a front wheel axis. For example, and as illustrated in FIG. 3, front wheel 100 includes first side 102 and opposing second side 104. The wheel 100, as illustrated in FIG. 4b, includes a central axis c at its midpoint 303, about which the wheel 100 is rotatable.

Similarly, embodiments of the invention may include a pair of pedals, each pedal configured to rotate the front wheel. Numerous types of pedal may be employed constant with embodiments of the invention. Such pedals may include fixed pedals, removable pedals, foldable pedals, or pedals that flip up, retract, or have an otherwise alterable configuration. Thus, as used herein, the term pedal refers to any structure that permits a rider to propel a tricycle using foot power. An example of pedals, consistent with embodiments of the invention, include pedals 141 and 142 (see, e.g., FIG. 3). In addition, a pedal may be configured to rotate the front wheel a portion of the time (e.g., during the first mode when the rider propels the tricycle, and may be removable from, disengageable from, folded onto, or otherwise deactivatable during a second portion of the time (e.g., during the second mode when a parent pushes the tricycle from behind).

Each of pedals 141 and 142 may be connected to the center of the front wheel 100, via pedal rod 140. The pedal rod may be continuous and connected to both pedals, or the pedal rod 140 may be configured of two independent sections, each connected to a separate one of the pedals 141 and 142. In a first mode of operation, the propelling factor of pedal rod 140 may be connected, by any mechanical interconnection means, to a rotating factor of the front wheel 100, thereby allowing rotation of the front wheel 100 using pedal rod 140. By rotating the pedal rod 140, the front wheel 100 may be rotated about its center axis, i.e. about the middle part of pedal rod 140 which may act as the front wheel 100 axle. Alternatively, the front wheel may have a separate axle to which one or a pair of pedal rods connects.

Pedal rod 140 may include three parts; a middle part located at a center of the wheel 100 and used, among others, as an axle of wheel 100, a left side for connection to a left pedal, and a right side for connection to a right pedal such as pedal 141.

Embodiments of the invention may include at least one blade configured to support the front wheel in a manner permitting the front wheel to rotate about the front wheel axis. As used herein, the term "blade" includes any structure capable of supporting the front wheel in a rotatable manner. A wheel may be supported, for example, on a single blade or on a pair of blades. FIG. 4a illustrates an example of a blade 130 used to rotatably support wheel 100. FIG. 3 illustrates wheel 100 supported by a pair of blades 130 and 131. When a pair of blades are employed, they are typically interconnected at upper ends opposite points at which they interconnect to the wheel axis and are collectively referred to as a fork (although, as used herein, the term fork may also include structures that have just one blade.) Thus, in various figures, a fork is generally designated with the reference numeral 130. The fork may be formed of individual blades that curve toward each other, or, interconnecting structure may join two individual fork blades.

The middle part of pedal rod 140 may be pivotally held by the opposing distal ends of fork blades 130 and 131 in a manner such that the front wheel is capable of rotating about its center axis. A mud guard 301 may be disposed near a top of the fork 133, opposite distal ends supporting the wheel.

Embodiments of the invention may also include a stem configured to extend from the head tube in a manner permitting the stem to rotate (i.e., rotatably connectable to the frame). A stem may be any structure connectable to the fork and that is capable of conveying a turning force to the fork and/or that supports the fork in a rotatable manner. For example, FIG. 4a illustrates stem 305 that extends from fork 133. Thus, when either the fork 133 or the stem 305 rotates, the other may rotate with it. The stem may be rotatably connected to the frame 700 via the frame's head tube 707. The frame's head tube 707 may be a part of the frame 700, wielded to frame 700, or connected to frame 700 by any other means such as bonding, screws, threading, or any other mechanism permitting connection of a head tube to a frame.

In some exemplary embodiments, it may be beneficial to employ a stem geometry that facilitates dual mode operation. For example, the maximum width of the front wheel (e.g., proximate the tread of the wheel) may be at least three times greater than the minimum diameter of the fork's stem. This configuration can lower turning friction, facilitating control from behind during the second mode of operation. In another embodiment, the stem may include a rod that has a minimum diameter that is at least four times smaller than an average width of the front wheel. The rod may have any structure that permits rotation, and may have a solid, hollow, or semi-solid. For example, the rod may be constructed of metal or other rigid material. The stem may be comprised of sections having varying diameters. In the above examples, a smallest or "minimum" diameter may be of particular interest, especially if that minimum diameter is at a rotational stem connection.

For example, when the front wheel maximum width is about 50 mm, the stem may have a minimum diameter of between about 6 mm and 12 mm, or less. When the front wheel maximum width is 55 mm, for example, the stem may have a minimum diameter of about 13 mm and 18 mm, or less. All else being equal, a narrower diameter stem facilitates greater steering control when the tricycle is pushed from behind. Thus, consistent with embodiments of the invention, the stem diameter may be less than one quarter the maximum front wheel width. By way of additional examples, when the front wheel maximum width is in a range of 45 to 55 mm, the stem may have a minimum diameter of 9 to 18 mm. For example, when the front wheel maximum width is in a range of 20 to 60 mm, the stem may have a minimum diameter of 4 to 15 mm.

The stem's minimum diameter may be greater than one third the maximum width of the front wheel, and the invention, in its broadest sense is not limited to any particular dimension.

Regardless of the dimensions of the stem, it may be held by a bearing which may reduce turning friction and facilitate the second mode operation and the first mode of operation as well.

As illustrated, for example in FIG. 4a, stem 305 may have a central axis a, and fork 133 may have a fork axis b and the stem 305 may be connected to the fork 133 in a manner such that the central axes a and b form an obtuse angle x there between. Angle x may be, for example, equal to or less than about 179° degrees. In some embodiments, angle x may be between about 170°-174°. In another embodiment the angle x may be between about 165°-179°. In a further embodiment the angle x may be between about 165°-173°. In yet another embodiment, the angle x may be between about 170°-175°. As the angle x approaches 180°, an ability to control steering from behind in the second mode of operation may be facilitated by a minimum stem diameter of three to four times smaller than the maximum width of the front wheel. Thus, when the angle x is between 165°-479°, a stem with a minimum diameter of three to four times smaller than a maximum width of the front wheel may be desirable. For example, as illustrated in FIG. 4b, width w of front wheel 100 may be at least three to four times greater than the diameter d of stem 305. For example, when the front wheel width w is in a range of 25 to 51 mm, the stem may have a minimum diameter d of 6 to 12 mm. For example, when the front wheel width w is in a range of 45 to 55 mm, the stem may have a minimum diameter d of 9 to 11 mm. For example, when the front wheel width w is in a range of 20 to 60 mm, the stem may have a minimum diameter d of 4 to 15 mm. In one embodiment the average diameter of the stem is at least three times smaller than the average width of the front wheel. For example, when the front wheel average width w is in a range of 45 to 55 mm, the stem may have an average diameter d of 9 to 11 mm. For example, when the average front wheel width w is in a range of 20 to 60 mm, the stem may have an average diameter d of 4 to 15 mm. In one embodiment, the maximum width of the front wheel may be at least three times greater than the maximum diameter of the fork's stem. For example, when the front wheel maximum width is in a range of 45 to 55 mm, the stem may have a maximum diameter of 8 to 15 mm. For example, when the maximum front wheel width w is in a range of 20 to 60 mm, the stem may have a maximum diameter d of 4 to 15 mm.

In embodiments of the invention, the stem axis may extend in a direction transverse to the front wheel axis. As illustrated in FIG. 4b, for example, the central axis a of stem 305 extends in a direction transverse to (i.e., extends in a differing direction) and is offset from rotational axis c of front wheel 100 by a distance y. In one embodiment, the minimal distance y may be no more than about 50 mm. In another embodiment, the offset distance y is in the range of between about 18 mm and 25 mm. In yet another embodiment, offset distance y is in a range of about 15 mm and 40 mm. As the offset distance decreases with all else equal, so to decreases an ability to turn the tricycle from behind using parental handle 500. Thus, in one embodiment, when the offset distance is between 15 mm and 22 mm, the angle x between the stem and the fork is between about 7 and 10 degrees, and the minimum diameter d of the stem 305 is at least three times less than the width w of the front wheel. This combination of geometries is exemplary of a configuration that may permit a parent to steer, in the second mode, when the stem axis a leads the wheel axis c, or may permit the tricycle rider to steer, in the first mode, when the wheel axis c leads the stem axis a, as will be discussed later in greater detail.

In one embodiment the fork axis a is designed to lead the front wheel axis c in the second mode of parental steering control. The leading stem axis in such instances positions the pedals further rearward than they would ordinarily be if the stem axis a trailed the wheel axis c, e.g. as in the first mode, potentially giving rise to a concern that the pedals may be too close to the rider for comfort. However, by employing a minimal angle x between the fork and the stem, peddles 141 and 142 may be maintained at a sufficient and comfortable distance from the rider without necessarily having to adjust the rider's position rearward, such as might occur with an adjustable frame (although adjustable frames may be used together with all embodiments of the invention). Thus, the frame 700 may be configured to maintain a fixed, non-adjustable distance between the fork stem and the rear wheels. This can occur, for example by constructing the frame 700 from a fixed length, non-adjustable piece of material. Alternatively, the frame may be constructed of multiple pieces in a manner that does not necessarily require adjustment of the frame length during use.

In one embodiment, the shortest distance between the front wheel center and the imaginary line of the stem axis is between 10 mm-30 mm. In another embodiment, the shortest distance between the front wheel center and the imaginary line of the stem axis is between 15 mm-25 mm. In yet another embodiment, the front wheel axis is designed to trail the stem axis in the second mode of operation. The figure though is non-limiting and alternatives may be employed, consistent with principles of the invention described herein.

In one embodiment the maximum width of the front wheel is at least three times greater than the minimum diameter of the fork's stem.

Embodiments of the invention may further include a rider handle, configured to turn the fork about a stem axis transverse to the front wheel axis. As used herein, the term "rider handle" is used broadly to refer to any structure, regardless of shape, material, or size, that can be grasped by a tricycle rider and used to turn the front wheel. For example the rider handle may be in the form of a handlebar, with a curved rod-like shape, or a straight rod-like shape. Alternatively, the rider handle may be in the form of a steering wheel or other closed or opened loop structure capable of manipulation by a rider. The rider handle may have a solid or open core. Like other parts of the tricycle, the rider handle may be made of any material or combination of materials.

The rider handle may be configured to turn the fork via a mechanical interconnection with, for example, either the fork or the stem. The mechanical interconnection may be direct or may include intermediate parts through which forces may be transferred via the rider handle to the front wheel.

Figure 5A:
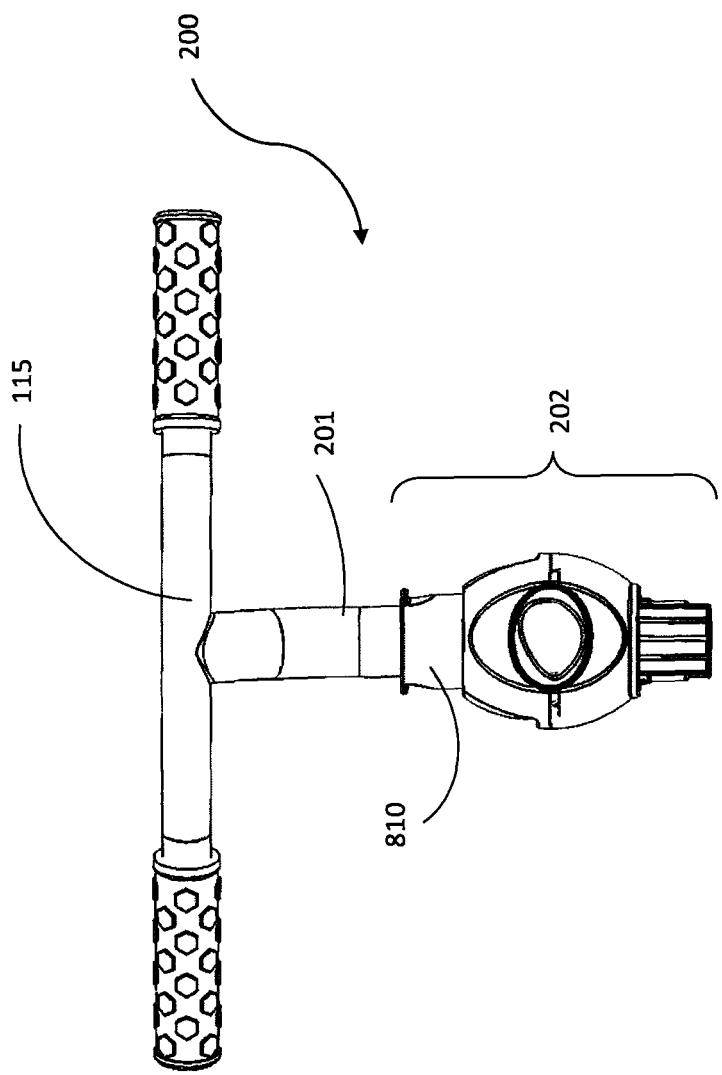
FIG. 5a is a front view of a handle assembly consistent with an embodiment of the invention.

By way of example only, a rider handle may include handlebar assembly 200 illustrated in FIGS. 1 and 2. As illustrated in greater detail in FIG. 5a, rider handle assembly 200 may include a handlebar 115, an arm 201, and a coupling mechanism 202.

The rider handle, in a first mode, may be configured to be rotationally coupled with the stem in a manner permitting a tricycle rider to exert forces on the rider handle and thereby turn the fork, and the rider handle in the second mode, may be configured to be rotationally uncoupled from the stem, preventing forces on the rider handle from turning the fork.

Rotational coupling and decoupling of the rider handle from the fork may be accomplished in numerous mechanical ways, and the invention, in its broadest sense, is not limited to any particular mechanical interconnection. Rather, any manner in which the rider handle may be coupled and uncoupled to the fork is considered to fall within the scope and spirit of the invention. Moreover, the location of a coupling decoupling mechanism is not necessarily critical to embodiments of the invention. It may be located between a rider handle assembly and a stem, or it may be located between a stem and a fork.

Thus, by way of example only, the coupling mechanism 202 may, in a first mode, permit mechanical interconnection between the rider handle and the fork such that when a tricycle rider applies a turning force to the rider handle, the turning force is conveyed to the front wheel via the fork. In a second mode, the coupling mechanism 202 may decouple the rider handle from the fork in a manner permitting the rider handle to turn freely without conveying turning forces to the fork. This may be accomplished, for example, by permitting selective coupling and decoupling of the rider handle from the stem. (e.g., selective coupling and decoupling of rider handle assembly 200 and stem 305).

Thus, the term "couple", "coupling", "coupling mechanism" and "rotational engageable" are meant herein to include any mechanical engagement which transfers the rotation of one part to the other coupled part, by causing it to rotate similarly.

When, in a first exemplary mode of operation the steering of tricycle 800 is accomplished using rider handle assembly 200, i.e. the turning, e.g. left or right, of rider handle assembly 200 turns the fork 130 which turns the front wheel 100, the rider may assume control of steering while simultaneously propelling the tricycle 800 using the pedals 141 and 142. If when the rider is in control in the first mode, a person walking behind the tricycle tries to push the tricycle from behind using parental handle 500, the rider may prevent the person walking behind from assuming control. Thus the rider handle may be mechanically disconnected from the stem. When this occurs, the rider handle may cease to function as a steering mechanism and may simply function as support that the rider may grasp for balance or in order to permit a child to pretend to steer. In this circumstance, the rider handle may lock in a stationary position rotationally disconnected from the fork and front wheel, or may rotate freely within a range of motion independent of the fork and the front wheel.

There are many differing ways in which a handle assembly may be rotatably coupled and decoupled from a fork or fork stem. The examples provided in this specification are not intended to limit the invention to any particular example. Other coupling and decoupling mechanisms may be used such as a detent, a pin, a screw connector, or any other connectors. One example, illustrated in FIG. 5c involves an engageable and disengageable coupling. For example, a coupling member 204 associated with the rider handle assembly 200 may include a surface that selectively mates with an extension of the stem. As illustrated in FIG. 5c, for example, a shaped end 308 of stem 305 is selectively mateable with a corresponding shaped slot 307 of coupling member 204. When the shaped end 308 is seated in slot 307, force exerted on the rider handle assembly 200 is capable of turning the stem 305, and consequently fork 133 and wheel 100. When the shaped end 308 is decoupled from slot 307 of coupling member 204, the rider handle assembly 200 may be incapable of turning the wheel 100.

The stem's top end 308, in this example, has an almost rectangular shape, although for most of its length the fork stein 305 is round. The opening 307, depicted in silhouette since the opening 307 is hidden from this view point, has a corresponding shape thereto. Hence, while being inserted into the opening, the fork stem 305 is affixed, i.e. it cannot rotate, inside the second coupling member 204. In one embodiment, the use a symmetrical shape for the stem's top 308 allows the inserting of the fork stem in two ways, one way for allowing the front wheel axis to lead the stem axis in a first mode of operation, and another way for allowing the front wheel axis to trail the stem axis in the second mode of operation. Moreover, the almost rectangular shape is non-limiting and many other, non-round shapes can be used for the purpose of affixing the fork stem 305 inside the second coupling member's opening 307.

Figure 5B:
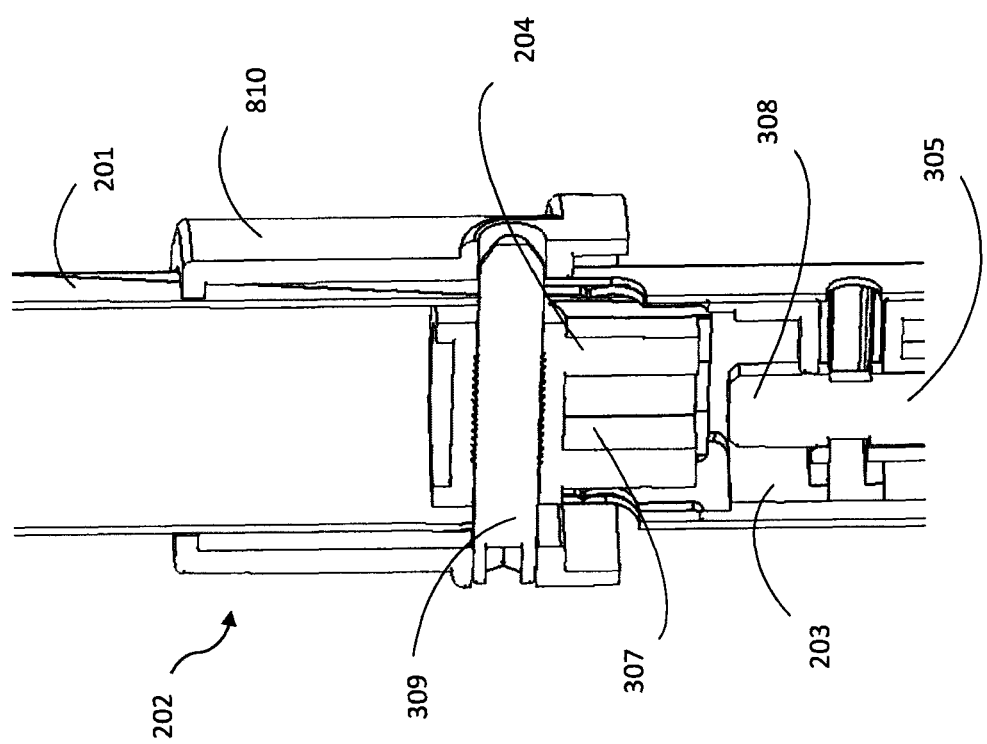
FIG. 5b is a cross-sectional front view of a coupling assembly consistent with an embodiment of the invention.
Figure 5C:
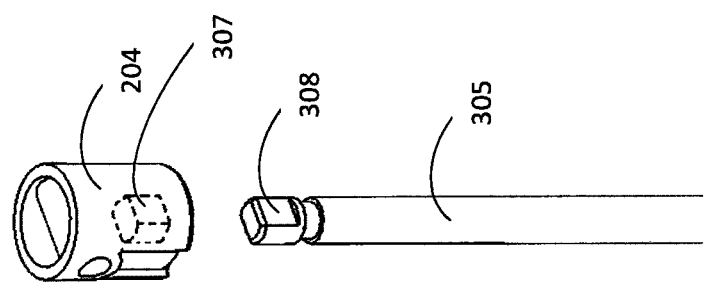
FIG. 5c is a perspective assembly view of a stem and coupling member consistent with an embodiment of the invention.

As illustrated in FIG. 5b, a knob 810, or any other manually activatable release mechanism, which may be a part of the coupling mechanism 202, may be used for coupling the handle arm 201 to the fork's stem 305. Specifically, and as described later in greater detail, when knob 810 is lifted, decoupling occurs, and when it is moved downward onto stem 305, coupling occurs. Thus, in a first mode, rider handle assembly 200 is rotationally engageable with the fork's stem 305 in a manner permitting a tricycle rider to exert forces on the rider handle 200 and thereby turn the fork. On the other hand, the rider handle 200 in the second mode, may be rotationally disengageable from the fork's stem 305 for preventing forces on the handle from turning the fork. Examples of other structures that may be used to selectively couple a handle to a stem include protruding spring-biased pins that can be depressed to decouple and which can snap back into place to couple; or using the pin 309 without part 810 for coupling and decoupling the ride handle 200 to the stem 305, as described in relations to FIG. 7, etc . . . .

FIG. 5b is a cross-sectional view of a part of the coupling mechanism 202, according to one embodiment of the invention. The mechanism 202 allows coupling of the handle arm 201 and the fork stem 305. Three main members are depicted in the diagram: a first coupling member 203, a second coupling member 204 and a grasping member 810 (or a knob). The first coupling member 203 is statically coupled to the handle arm 201, thereinside. In the middle of the first coupling member 203 there is a shaft through which the fork stem 305 can be inserted. The second coupling member 204 is positioned inside the top end of the first coupling member 203, being slideable up and down. In the bottom of the second coupling member 204 there is an opening 307 into which the top end 308 of the fork stem 305 may fit. When the second coupling member 204 is in its upper position, it is disengaged from the fork stem 305. When the second coupling member 204 slides down, the fork stem 305 is inserted into the opening 307, and a coupling is achieved between the second coupling member 204 and the fork stem 305, and hence also between the steering arm 201 and the fork stem 305. In order to affix the fork stem 305 inside the second coupling member's 204 opening, the fork stem 305 has a non-round shape in its top end and the opening has a corresponding shape thereto, as illustrated in a non-limiting way. The grasping member 810 is, on one hand, external to the handle arm's tube 201 and on the other hand internal and connected to the second coupling member 204, by a connecting element 309 such as a pin, a screw, or any other element. Thus by sliding the grasping member 810 up and down, the second coupling member 204 also slides up and down as well. Moreover, the grasping member 810 as depicted in the diagram provides the individual using it a better grip and easier control on the second coupling member's 204 position (whether up or down). However, in other embodiments the grasping member 810 is redundant or not required, and then, the connecting element 309 alone may be used as a third coupling member, as described in relations to FIG. 7. The connecting element 309 has been depicted as a single element, such as pin etc. connecting both sides of the third coupling grasping member 810 via the handle arm 201 and the second coupling member 204. This is not mandatory though and in other embodiments other solutions can be applied instead. For example, by having a third coupling member composed of two parts (e.g., a "right part" and a "left part"), a short pin can be coupled to each part, while the short pin can penetrate the steering arm and form the connection with the second coupling member, whereas, in another embodiment, the two parts may be connected by a spring. In one embodiment second coupling member 204 may be designed from two interconnecting parts each made from a different material.

In one embodiment, the coupling mechanism 202 may be in the front tube 707 of the frame 700. In other embodiments, the coupling mechanism may appear on top of the front tube 707. In other embodiments, the coupling mechanism may appear below the front tube 707.

Figure 6:
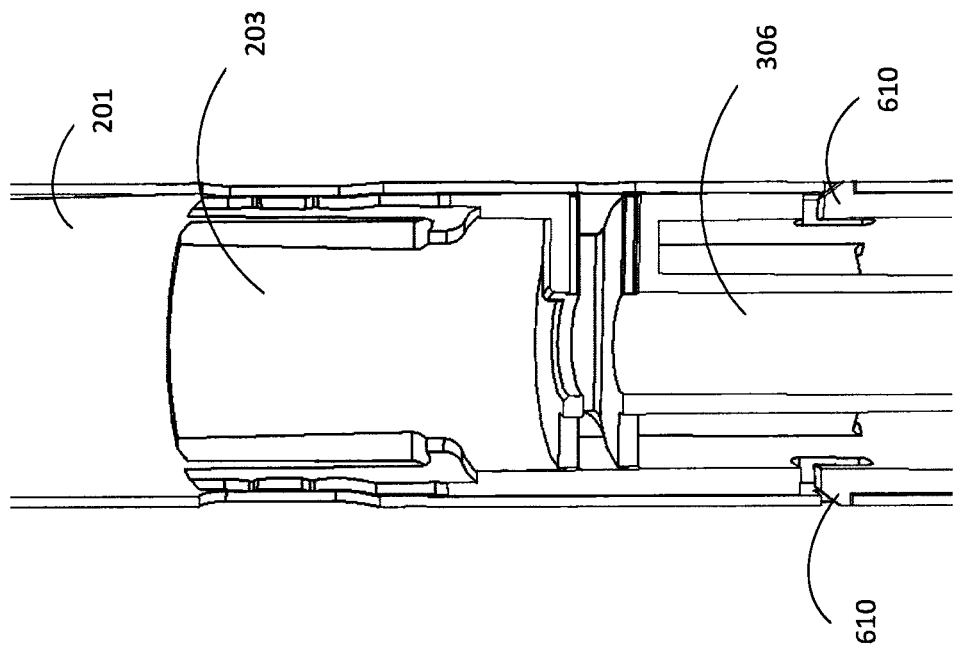
FIG. 6 is a cross sectional side view of a coupling member consistent with an embodiment of the invention.

FIG. 6 is a cross-sectional view of the handle arm 201 holding the first coupling member 203, according to one embodiment of the invention. As depicted in the diagram, the first coupling member 203 is held by grasping elements 610, such as snaps, in the handle arm's tube 201. In the presently illustrated example, there are two snaps holding the first coupling element, one of each side, yet this in non-limiting and any other number of snaps can be used, as long as the first coupling member is affixed within the steering arm's tube. The shaft 306 is the shaft in which the fork stem may slide in. These figures though are non-limiting, and other coupling mechanisms may be used and other alternatives may exist.

Figure 7:
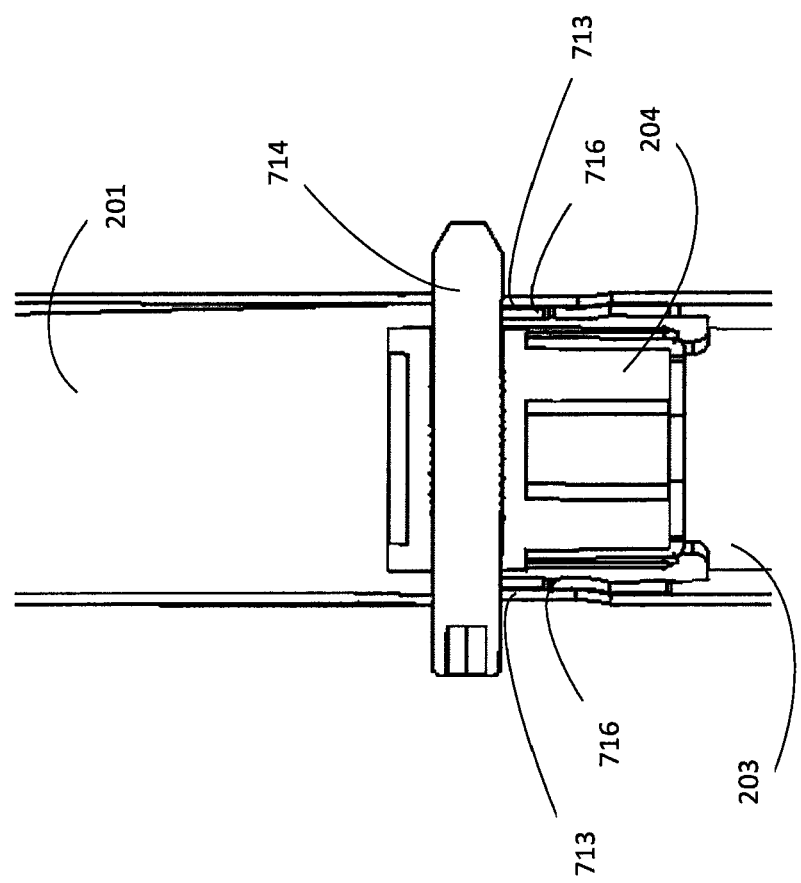
FIG. 7 is a cross-sectional side view of a coupling assembly consistent with an embodiment of the invention.

FIG. 7 is a cross-sectional side view of the second coupling member 204 inside the first coupling member 203, according to one embodiment of the invention. In the handle arm's tube 201 there are grooves 713. Through these grooves a guiding element 714, connected to the second coupling member 204, can slide up and down, thus lifting and lowering, respectively, the second coupling member 204. The second coupling member 204 should stay in a low, down position when coupled to the pivot, and in an upper, high position when disconnected therefrom, a locking mechanism is described. According to one embodiment, this locking mechanism comprises protrusions 716 in the groove 713. When the guiding element crosses a protrusion 716, it is locked therebehind. In order to allow crossing of the guiding element, the protrusion should be made of a flexible or resilient material. In addition, if the steering arm is made of a non-flexible material, it is possible to attach thereto another layer of a flexible material, either from the inside or from the outside, forming the protrusion in this flexible layer. In the present embodiment, the first coupling member 203, which is attached to the handle tube 201 from the inside, can form this layer. Hence, as illustrated in the diagram, grooves are seen also in the first coupling member 203, wherein the protrusions 716 are implemented therein. This is non-limiting though and instead of using the first coupling member as the flexible layer, other solutions may be provided as a dedicated piece of flexible material which is attached to the handle arm's tube instead. Yet other embodiments may use other solutions, alternative to the protrusions, such as using a screw as the guiding element, screwing it in the position where it needs to be locked.

In those cases when the coupling mechanism includes a knob, such as element 810, as described with reference to FIG. 5b, the guiding element may form also the connecting element 309. Alternatively, there may exist a connecting element 309, which is additional to the guiding element. In one embodiment the guiding member alone may be the knob used for coupling and/or decoupling.

Figure 8:
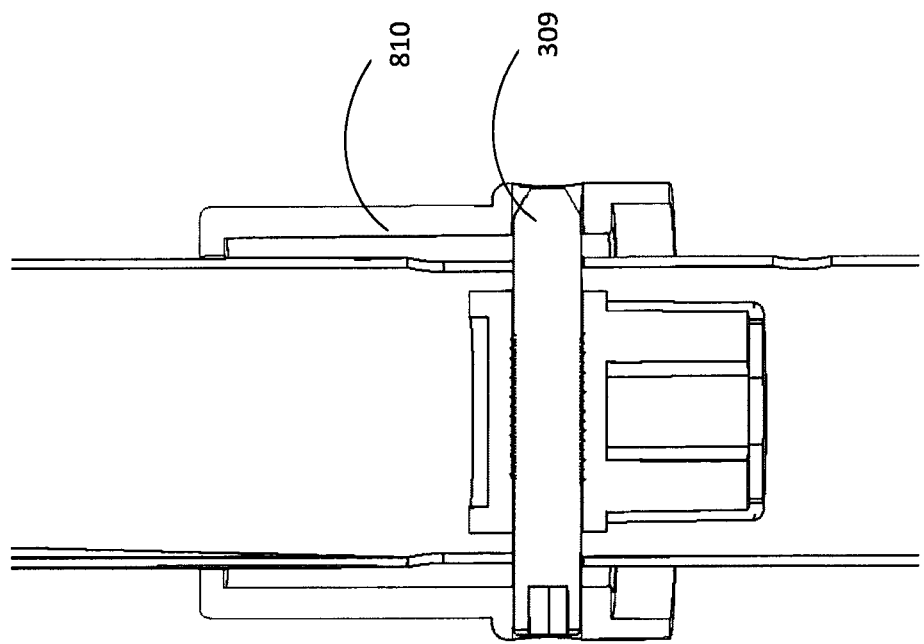
FIG. 8 is a cross-sectional side view of another coupling assembly consistent with an embodiment of the invention.

FIG. 8 illustrates the knob 810, according to one embodiment of the invention. As was noted above, in one embodiment, the connecting element 309 is able to slide up and down in the groove.

Figure 9A:
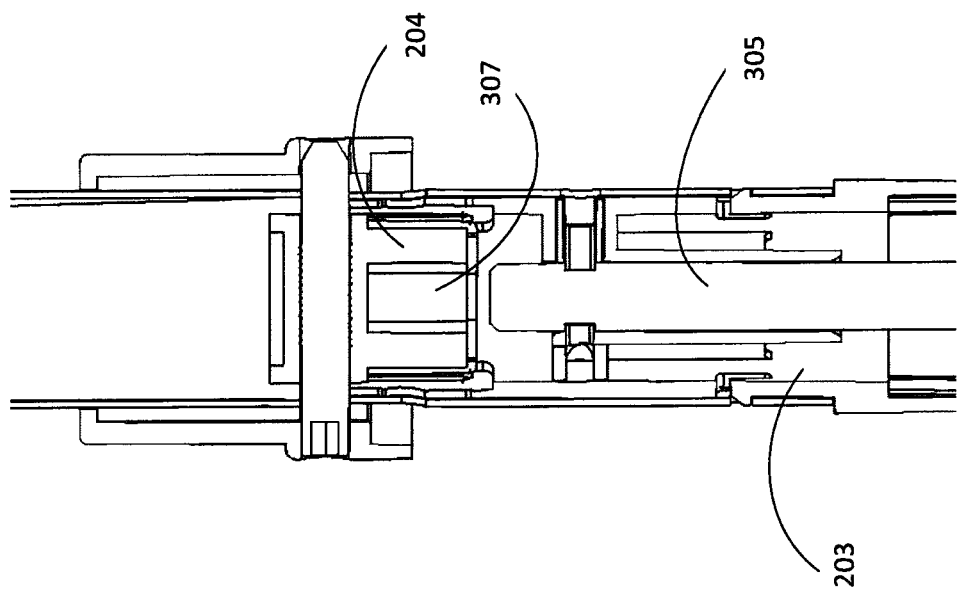
FIG. 9a is a cross-sectional side view of yet another coupling assembly in an uncoupled position, consistent with an embodiment of the invention.
Figure 9B:
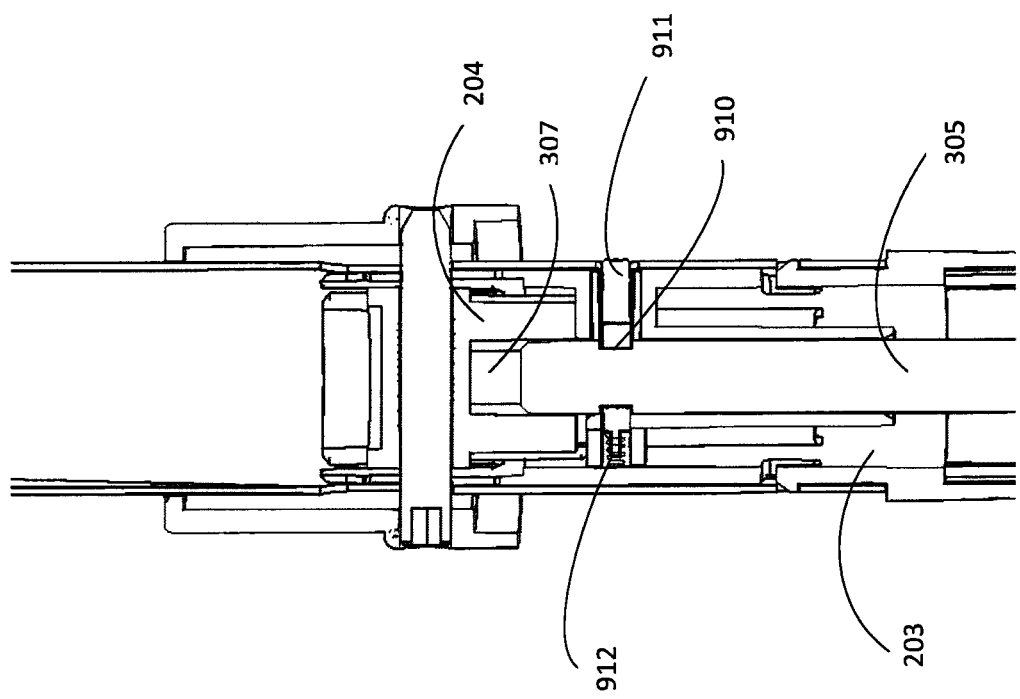
FIG. 9b is a cross-sectional side view of the coupling assembly of FIG. 9a in a coupled position.

FIG. 9a is a cross-sectional side view of the coupling mechanism in the uncoupled position. It can be seen, from looking at FIG. 9a that the top end of the fork stem 305 is free, that is, it is not inserted into the opening 307 of the second coupling member 204. FIG. 9b is a cross-sectional side view of the coupling mechanism in the coupled position. In FIG. 9b, illustrating the coupled position, the top end of the pivot is inserted into the opening 307. In each one of the positions described with reference to FIGS. 9a and 9b, the fork stem 305 is rotatably held in the first coupling member 203. In order to keep the fork stem 305 held in the first coupling member 203, the fork stem 305 has an indentation 910. The indentation may include, for example, a groove that fully or partially circumscribes the stem 305, or it may include a confined recess in the stem 305. A locking member 911 having a spring 912, clenching the pivot's indentation, may prevent it from sliding out and releasing therefrom. Therefore, the locking member 911 may prevent the fork stem 305 from releasing from the coupling mechanism.

Figure 10:
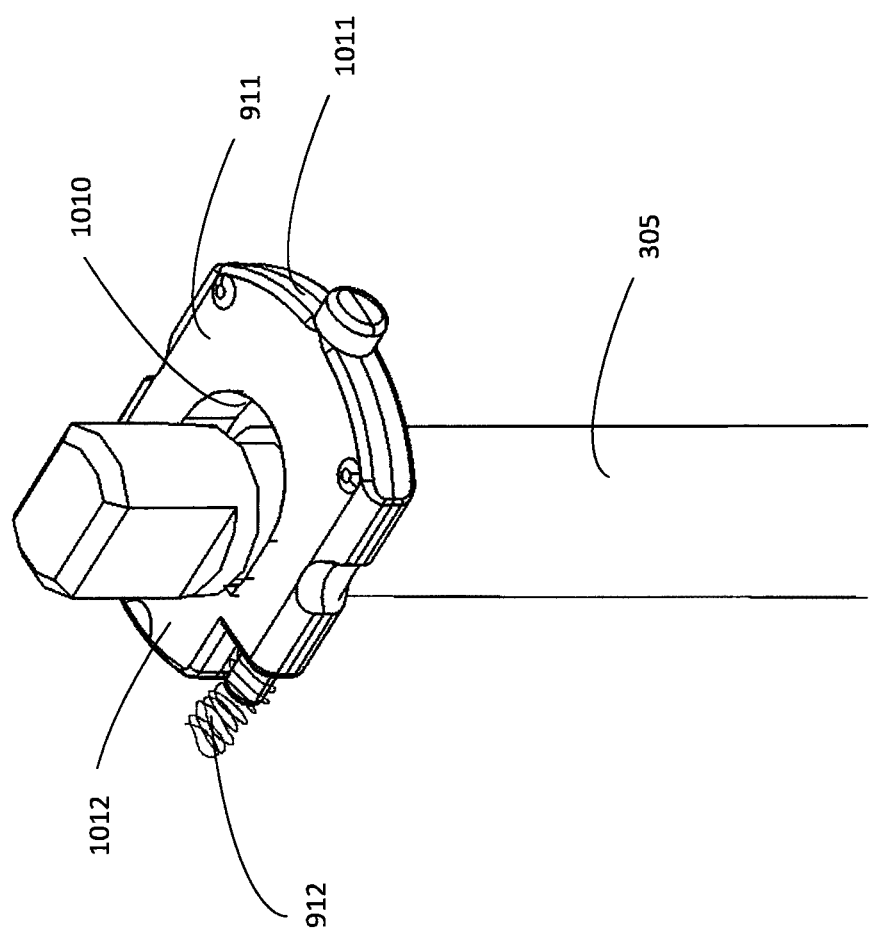
FIG. 10 is a perspective view of a holding mechanism, according to one embodiment of the invention.

FIG. 10 is a perspective view of the holding mechanism for engaging the fork stem 305, according to one embodiment of the invention. The locking member 911, in this case, has an oval opening 1010 through which the head of fork stem 305 can pass, and one or more springs 912. The locking member 911 has a first side 1011 and a second side 1012. It is noted though that the locking member is not necessarily rectangular and it may not have definable sides. However, in order to explain the affixing mechanism, the embodiment illustrated is nearly rectangular in shape. When inserted into the handle tube, or into the first coupling member, the spring/springs 912 push the locking member 911 towards its 1011 side, against the tube's wall. Upon inserting the fork stem 305 (see FIG. 9a), into the shaft 306 (see FIG. 6) of the first coupling member, the fork stem 305 reaches the locking member 911. Then, the top of the stem's end pushes the locking mechanism 911 towards its 1012 side. When the stem's indentation reaches the locking mechanism 911, the spring/springs 912 are slightly released and push the mechanism into the indentation, thus affixing the fork stem 305 in correspondence to the locking mechanism 911 and hence also in correspondence with the first coupling member. The mechanism illustrated in FIG. 10 is non-limiting and many other one-time locking mechanisms known per se may be used alternatively, as applicable.

Embodiments of the invention may also include one or more rotation restrictors. These rotation restrictors may restrict the front wheel to a certain angle. For example, in the first mode, where the front wheel axis may lead the fork axis, the front wheel may be restricted to an angle D (See FIG. 21) of between 70°-100° in order to prevent the front wheel, or the rider handle, from hurting the rider while riding. In another embodiment, the front wheel may be restricted to an angle of between 50°-150°. In another example, in the second mode, where the front wheel axis may trail the fork axis, the front wheel may be restricted to an angle of between 70°-100° in order to prevent the front wheel from turning to a position where the front wheel axis leads the fork axis during travel. In another embodiment the front wheel may be restricted to an angle of between 50°-179°. As used herein, "a rotation restrictor for preventing" includes any structure capable of restricting the rotational movement of the front wheel, regardless of whether the restrictor completely prevents rotation past a certain point, or whether the restrictor only prevents rotation past a certain point when forces exerted are below a threshold (e.g., the restrictor may exert a bias force that may be overcome by an opposing force greater than the bias force.) In either instance, rotation restrictors consistent with embodiments of the invention may be used to maintain the front wheel in a certain temporal orientation whether the front wheel axis leads the fork axis or whether the front wheel axis trails the fork axis.

In one embodiment the rider handle angle is restricted due to safety considerations, protecting the body of the rider from being hit by the rider handle. In one embodiment the turning angle of the rider handle may be between 80° and 100°. In one embodiment the turning angle of the rider handle may be around 90°. In one embodiment the turning angle of the rider handle may be between 20° and 170°.

With such configurations, in some embodiments, the front wheel of a tricycle may be maintained in one of two positions, according to first and second modes of operation. In a first mode of operation, the wheel axis may lead the stem axis and in a second mode of operation, the front wheel may be rotated backwards and maintained in a position where the stem axis leads the front wheel axis. Thus, in some embodiments, all a parent need do to take over steering control is to disengage the rider handle from the front wheel and turn the front wheel backwards. In one embodiment the rotating factor of the pedal rod may be disengaged from the rotating factor of the front wheel. In another embodiment the pedals may be folded as well. Similarly, if a parent is pushing the tricycle, and desires to turn steering control over to the rider, all the parent need to do, in this embodiment, is to turn the front wheel to the front and couple the rider handle to the front wheel. In one embodiment the rotating factor of the pedal rod may be engaged to the rotating factor of the front wheel. In another embodiment the pedals may be unfolded as well.

Depending on the embodiment, the tricycle may provide an option of changing pedal position between modes of operation. In one embodiment a footrest 300 (see FIG. 2) may be connected to the main frame 700 for allowing the rider to rest his feet on the footrest 300 while the tricycle 810 is being pushed from behind. In one embodiment the footrest 300 is foldable, and it may be folded backwards under the chair 600 or it may be folded in any other way. In one embodiment the pedal rod 140 propelling factor may be disengaged from the rotating factor of the wheel 102, effectively allowing the pedals to stay static while the tricycle 810 is being pushed. The method for engaging and disengaging the pedal rod propelling factor and the rotating factor of the wheel is known in the art. In the second mode of operation the rider handle 200 may be uncoupled from the fork 130, effectively allowing an individual to push the tricycle 810 from behind and steer it using the parental handle 500 while the rider sits on the chair 600, rests his feet on the foot rest 300 and rests his hands on the rider handle 200. Meaning that in this second mode of operation, the steering of the tricycle 810 does not have to interfere with the rider's hands holding the rider handle 200. Nevertheless, the tricycle 810 may be changed to the first mode of operation by coupling the fork 130 with the rider handle 200, optionally detaching the parental handle 500, optionally folding the footrest 300, and optionally reengaging the pedal rod 140 to the front wheel 102. Thus in the first mode of operation the rider can propel the tricycle 810 by himself using the pedal rod 140 and steer the tricycle 810 by himself using rider handle 200.

Figure 11:
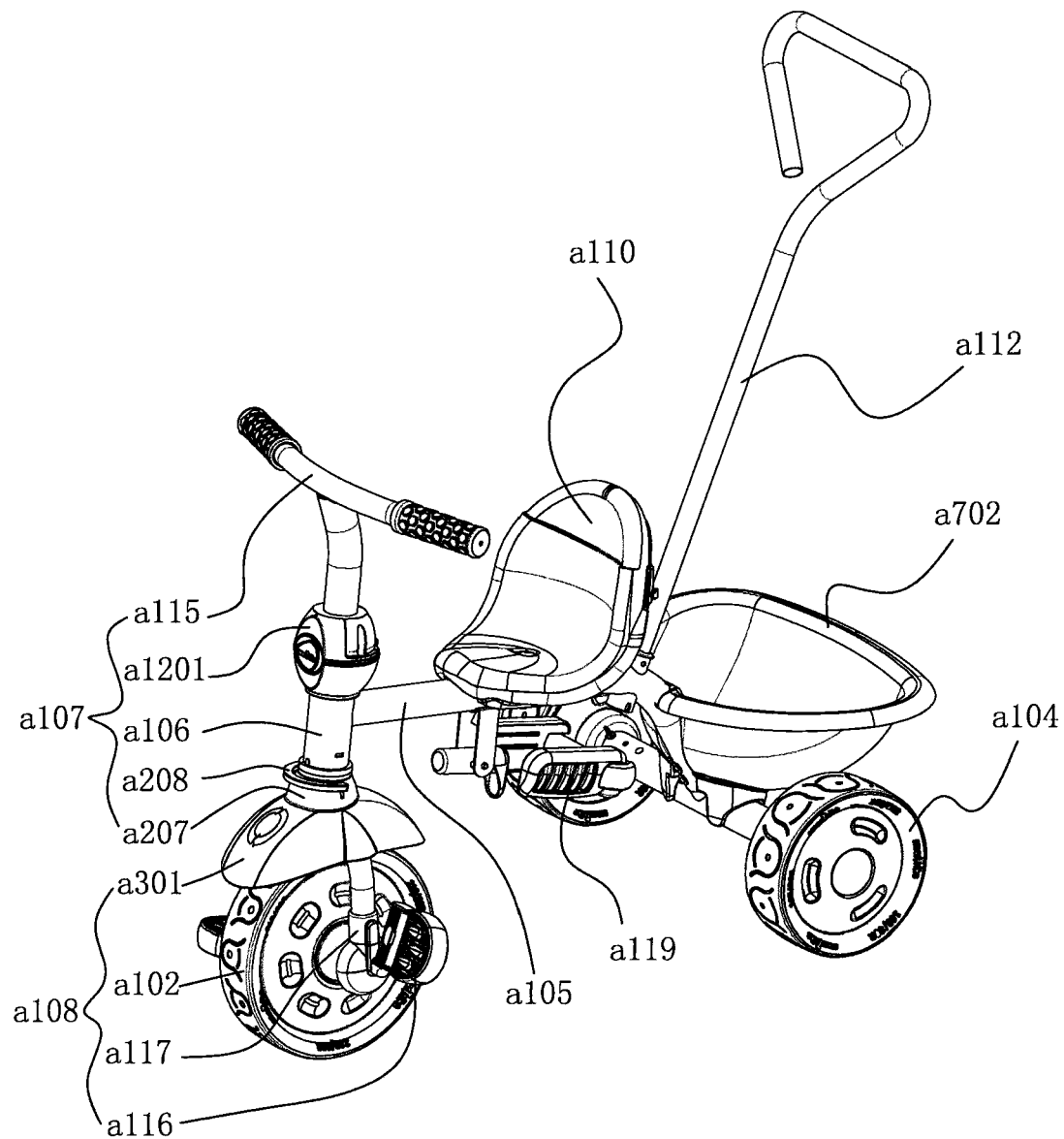
FIG. 11 is a schematic diagram of a tricycle, having a swivel wheel, according to another embodiment of the invention.

FIG. 11 is a perspective view of a tricycle, having a swivel wheel, according to another embodiment of the invention.

The tricycle may include a frame a105, a steering assembly a107, a front tube a106, which may be attached to the frame a105, and which pivotally holds the rider handle's a115 arm, a supporting structure a207, and a pressure transferring element a208 which is shown in its forward placement. The wheel assembly a108 includes a front wheel a102, a mud-shield a301, a pedal a116 and shock suspension a117, where, in the first mode of operation, the front wheel a102 may be steered by the steering assembly a107. In one embodiment, the supporting structure a207 and the mud-shield a301 may be made from one piece, however alternatives may exist, for example, the supporting structure a207 may be joined or disjoined from the mud-shield a301, using snap-ins, screws, or any other adjoining techniques. Two rear wheels such as rear wheel a104 may be located respectively at the two sides of the back of the frame a105 and rotatably held by the back of the frame a105. The frame a105 and the steering assembly a107, the wheel assembly a108 and the two rear wheels, may constitute the body of the tricycle vehicle, according to an embodiment. The tricycle vehicle may also include one or more of the following: a seat a110 which may be assembled and disassembled, a foldable leg support mechanism a119, a handle a112 which enables an external control of the tricycle vehicle, and a basket a702. Furthermore, the tricycle may also include an enclosure a1201 attached to the front tube a106 for protecting the steering assembly a107, and for other purposes as well.

Figure 12:
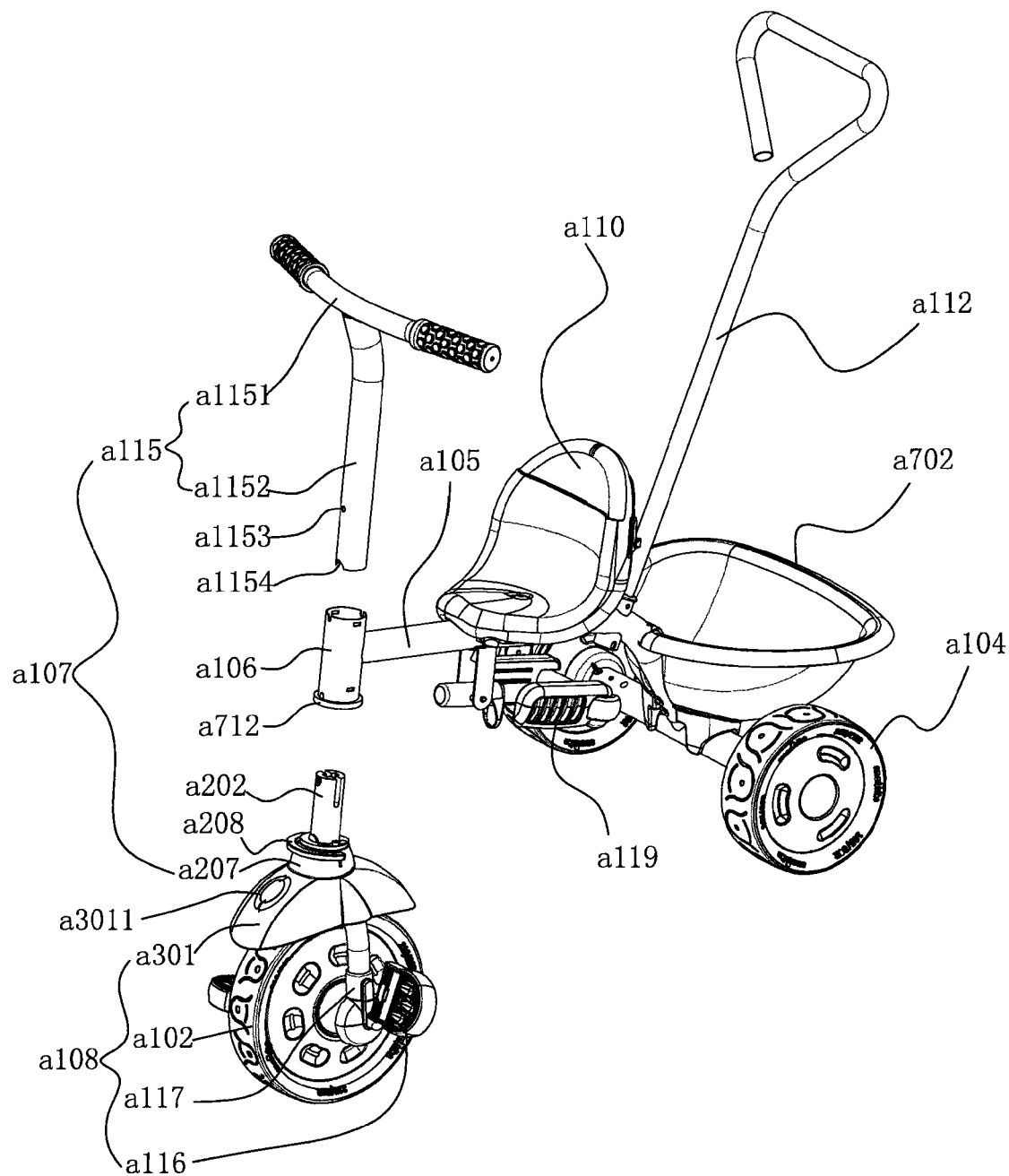
FIG. 12 is a partial assembly view of the tricycle of FIG. 11.

FIG. 12 is a partial assembly view of the tricycle of FIG. 11, having a swivel wheel, where the enclosure a1201, is omitted. The rider handle a115 may include a rail a1151 and a vertical bar a1152, which extends from the center of the rail a1151 downwards. A hole a1153 may be configured on the vertical bar a1152, and on the lower end of the vertical bar a1152 a notch a1154 may be configured. Inside the bottom of the front tube a106 may be configured a rotation restricting mechanism a712. The tricycle vehicle may include a mechanism a202, for coupling and decoupling the handle bar a115 and the wheel assembly a108. In an embodiment, a turning sign a3011 may be located on the mud-shield a301 for indicating the front wheel's assembly a108 direction. The direction of the front wheel's assembly a108 may be changed by pressing the pressure transferring element a208 and switching the front wheel's direction.

Figure 13:
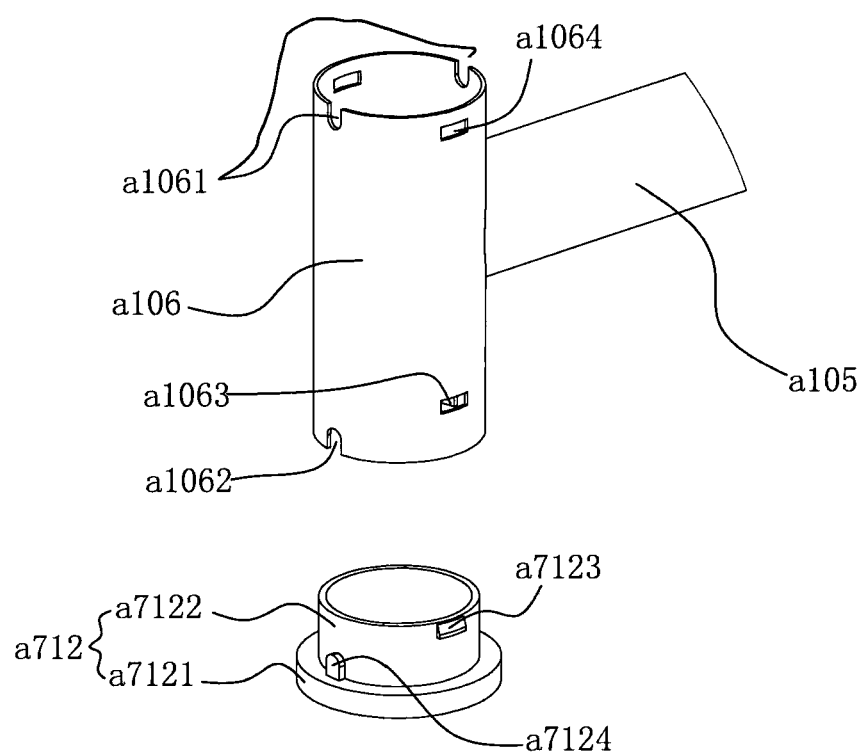
FIG. 13 is a schematic diagram of an enlarged front tube of the tricycle of FIG. 11.

FIG. 13 is an enlarged perspective view of an assembly of front tube a106, according to an embodiment of the invention. On the top end of the front tube a106 two notches a1061 may be located which are corresponding to the two notches a1062 (one notch a1062 is hidden) on the lower end of the front tube a106. On the lower part of the front tube a106 two opening a1063 (one of the openings is hidden from view) may be located, on the upper part of the front tube a106 two openings a1064 may be located as well, where the four opening a1063 and a1064 may be separately located on the position of ¼ of a circle from the two notches a1061, and a1062 respectively. The notches a1061 and the opening a1064 may be configured for assisting in the assembly of the enclosure a1201. The notches a1062 and the opening a1063 may be configured for assisting in the assembly of the rotation restricting mechanism a712. The rotation restricting mechanism a712 may comprise the base a7121 and a shaft a7122 which extends upwards from the base a7121, on the upper part of the shaft a7122 two snaps a7123 may be configured, and on the lower part of the base two protrusions a7124 (one protrusion may be hidden) may be configured. While the shaft a7122 may be inserted into the front tube a106, the snaps a7123 correspond to the opening a1063 and locking therein, the protrusion a7124 may slide into the notches a1062 which have a corresponding shape thereto.

Figure 14:
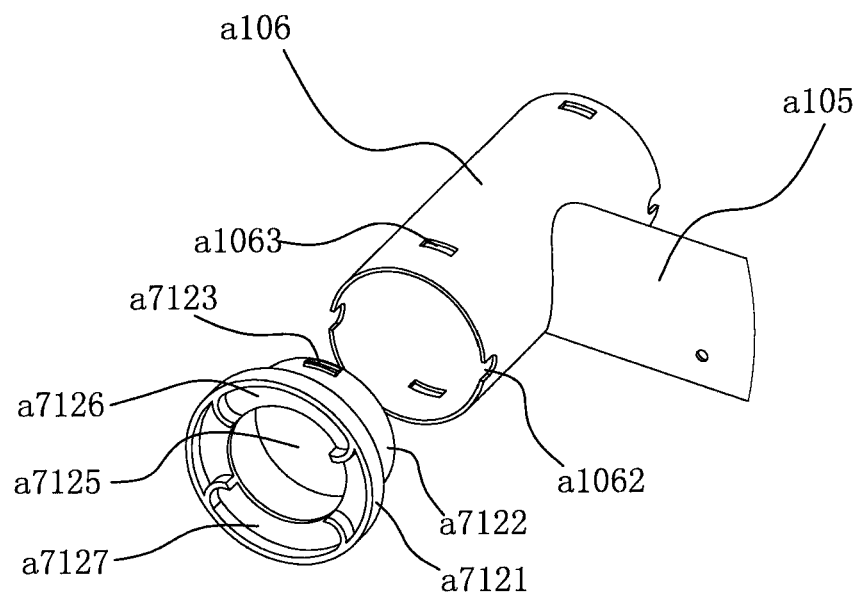
FIG. 14 is a schematic diagram of the enlarged front tube of FIG. 13 with an associated interconnecting base.

FIG. 14 is another enlarged perspective view front tube a106 and its interconnecting base a7121, according to an embodiment of the invention. The base a7121 and the shaft a7122 are round shaped, and both are hollow in the middle the base having a hole a7125. On bottom of the base a7121 facing down are configured two non-continuing grooves, or recessed members, a7126 and a7127, where each has the form of an arch having two ends, substantially in the perimeter of the front tube a106. The two grooves (recessed members) a7126 and a7127 may be allocated on opposing sides from each other. In one embodiment, the grooves a7126 and a7127 may be formed together with the base a7121. Alternatives may be used as well, for example, the base a7121 may be composed from two pieces, and each groove may be configured on one of the parts of the base.

Figure 15:
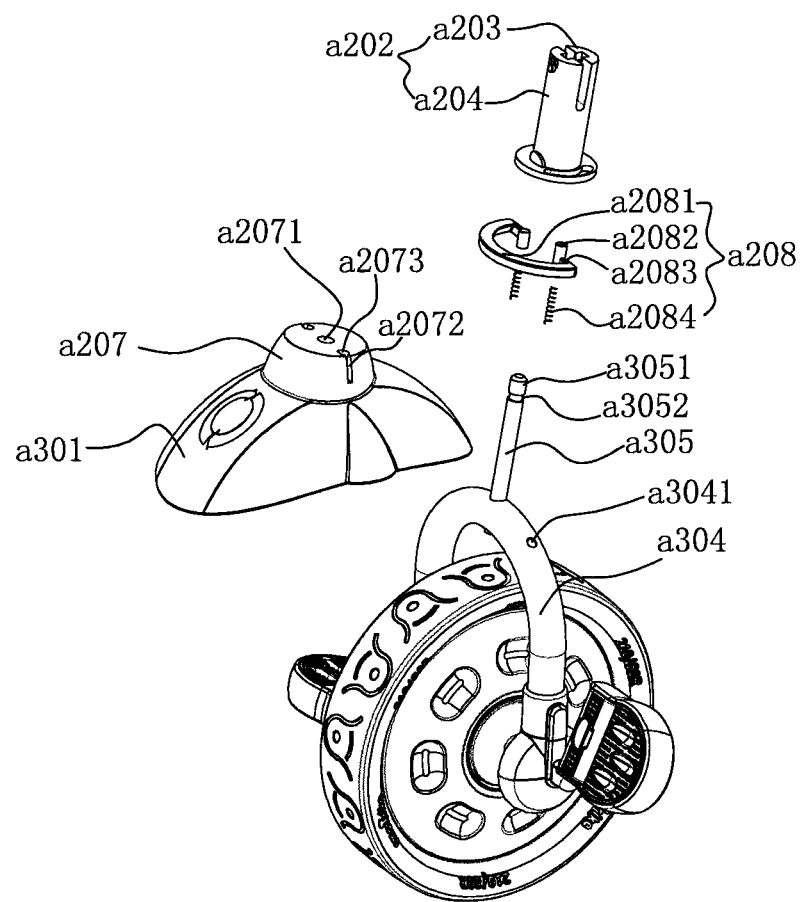
FIG. 15 is an assembly view of the front wheel assembly of the tricycle of FIG. 11.

FIG. 15 is a perspective assembly view of a front wheel assembly, according to an embodiment of the invention. The wheel assembly a108 may include a fork a304 which may be affixed to two ends of the axle of the front wheel, and a stem a305 attached to the top of the fork a304. The fork a304 may have a hole a3041 for assisting the placement of mudguard a301. On the top end of the stem a305 an indentation a3052 may be located. The part a202 may be formed of two parts a203 and a204, where the part a202 may be connected to the stem a305. The supporting structure a207 and mud-shield a301 may be made of one piece using the injection method or any other known method. Alternatively, other embodiments may be used. For example, the support structure a207 may be affixed to the mudguard a301. The support structure a207 may include a cone extending from the top of the mud-guard a301. The cone may have a center hole a2071 on the top part of the cone, for the stem a305 to slide through therein, and on the side of the cone a cavity a2072 may be configured to allow a guide element to slide through. The pressure transferring element a208 may include a connector lever a2081, two positional columns a2083 extending down which are on two ends of the of connector lever, and two springs a2084 may be affixed under the two positional column a2083, for pushing upwards the guide element a2082, which is formed from one of the positional column a2083 extensions.

Figure 16:
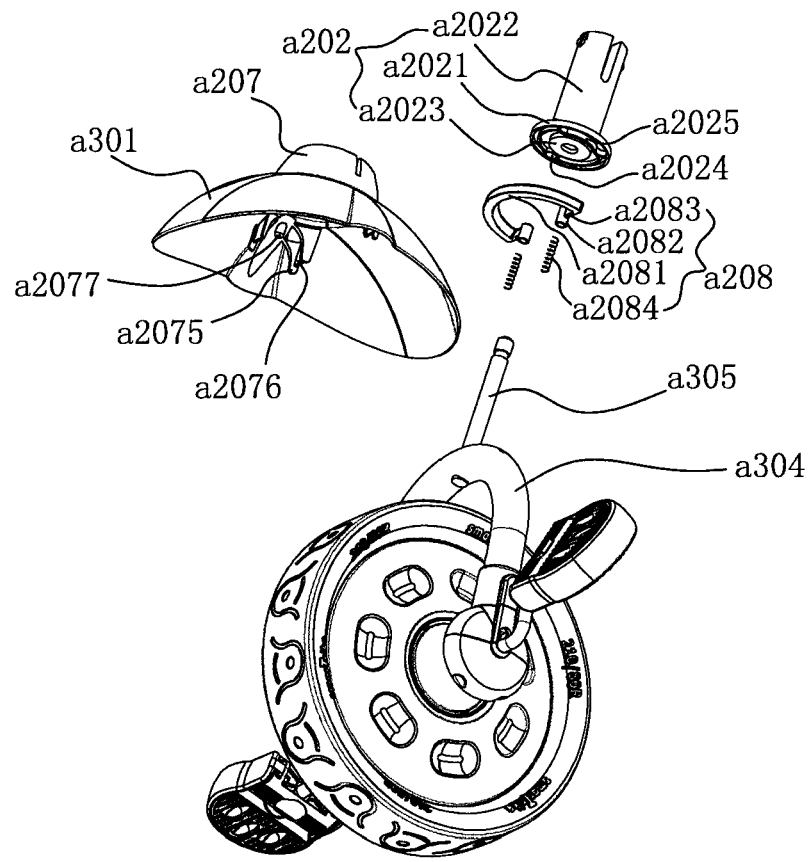
FIG. 16 is a further assembly view of the front wheel assembly of the tricycle of FIG. 11.

FIG. 16 is another assembly view of the front wheel assembly, according to an embodiment of the invention. The coupling part a202 may comprise a base a2021, a shaft a2022 extended upwards from the base a2021, and a bearing a2023 affixed inside of the base a2021. The base a2021 may have a restricting mechanism, which may be formed of a lock hole a2024 and a lock groove a2025, where the positional column a2082 may be inserted into either the lock hole a2024 or the lock groove a2025. The supporting structure a207 may have a grasping element in order to affix the supporting structure a207 to the fork a304. The grasping element may constitute two sets of side walls a2075 which are extending down, and a cross wall a2076 connecting two side walls of each set. The bottom shape of each set of side walls a2075 and cross walls a2076 are corresponding to the top shape of the of the fork a304, the grasping element configured a positional column a2077 extending down which may be inserted into the hole a3041 (see FIG. 15) of the fork a304 in order to assemble the support structure a207 and fork a304 together.

Figure 17:
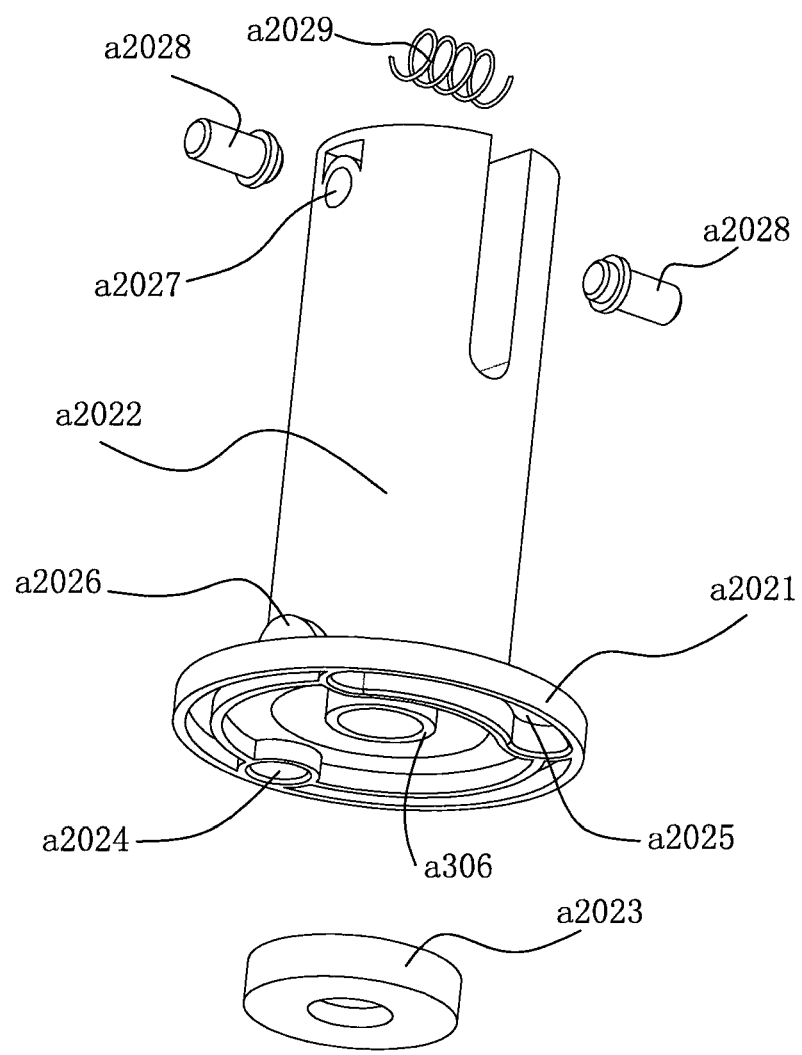
FIG. 17 is an assembly view of the coupling part of FIG. 16.

FIG. 17 is a schematic diagram of an exploded view of coupling part a202, according to an embodiment of the invention. The coupling part a202 may have a shaft a306 configured for the stem a305 to slide through. On the upper part of the shaft a2022 of the coupling part a projection locking mechanism may be configured. The locking mechanism may include locking elements a2028 and a spring a2029. The shaft a2022 may have two holes a2027, where the two locking element a2028 may project out of the holes a2027 by applying the spring a2029 to pressure the two locking elements a2028 from inside the shaft a2022 out. Other locking mechanisms may be used as well. The protrusion a2026 on the lower part of the shaft a2022 is configured to correspond to the notch a1154 (see FIG. 12) configured at bottom of the vertical tube a1152 for attaching the coupling part a202 to the steering arm a115.

Figure 18:
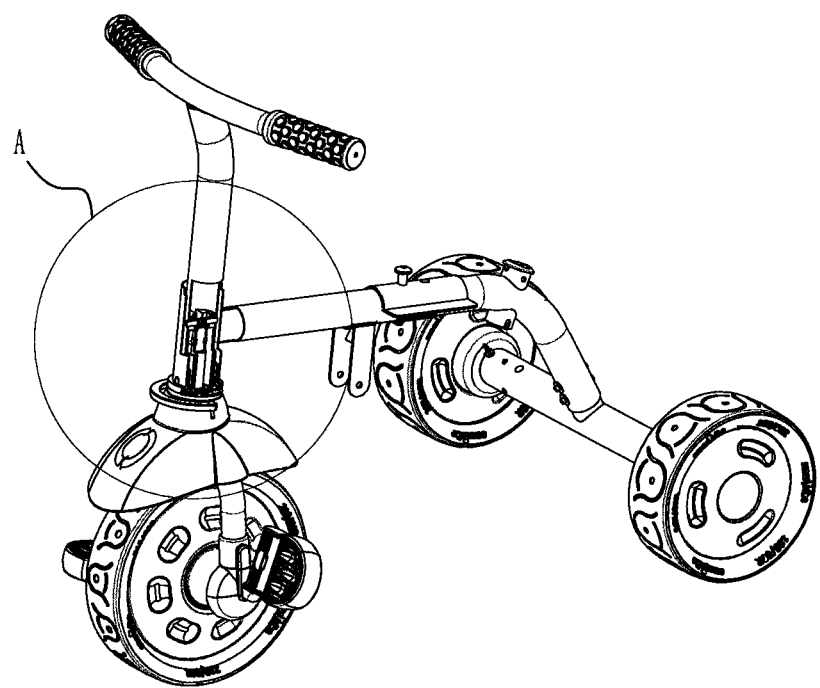
FIG. 18 partial cut-away view of the shaft and the coupling mechanism according to an embodiment of the invention.
Figure 19:
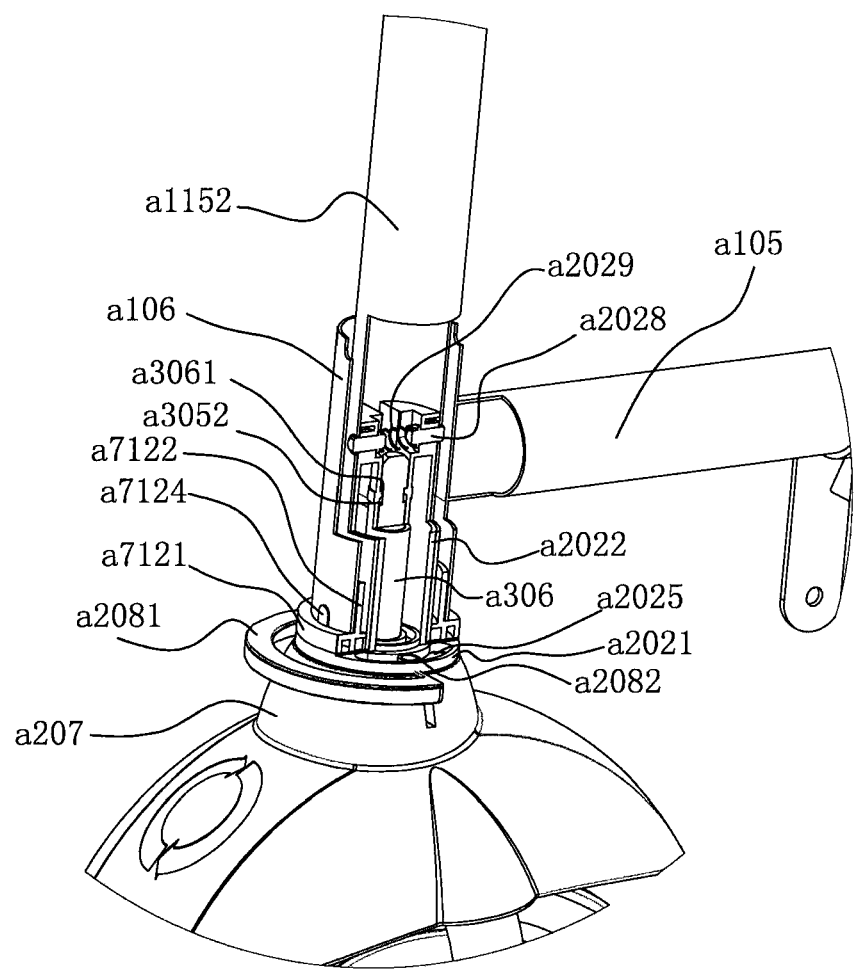
FIG. 19 is an enlarged partial cross-sectional view of the shaft and the coupling mechanism of FIG. 18.

FIG. 19 depicts a partial cut away view of the region circled in FIG. 18. Specifically, FIG. 19 depicts a cross-sectional view of the shaft a2022 and the coupling mechanism used to connect the vertical tube a1152 of the steering arm a115 and the shaft a2022, according to one embodiment. In this embodiment, the two locking elements a2028 projecting out of the two holes a1153 (See FIG. 12) and are configured to hold on vertical bar a1152, in order to assemble the coupling part a2022 and the vertical tube a1152 of steering arm a115 in alignment to each other. In the upper part, of coupling part a2022, a projection a3061, which extends inside, engages indentation a3052 on the upper end of the stem a305, for the coupling the coupling part a2022 to the stem a305. The base a2021 of the coupling part a2022 may be stationed between the top of supporting structure a207 and the bottom of the restricting mechanism a7121.

In one embodiment, the hole a2024 (see FIG. 17) on the base a2021 of coupling part a2022 may correspond to the center of the recessed member a7126 (see FIG. 14) of the rotation restricting mechanism a712, where the groove a2025 may correspond to the recessed member a7127 of the rotation-restricting mechanism a712. Therefore, when in the first mode, i.e. the rider-steerable mode, the connector lever a2081 of the pressure transferring element a208 may face front, and the guide a2082 (see FIG. 15) may be inserted in the hole a2024 of the coupling mechanism a202 and inserted in the recessed member a7126. In this configuration the rail a1151 of steering arm a115 is essentially coupled with the supporting structure a207 which is connected to the front wheel assembly a108, thus enabling the rider to steer the tricycle.

The rotating angle of the steering arm a115, in the first mode, may be limited to the length and curve of the recessed member a7126. In other words, the maximum angle of the steering arm a115 turning may correspond to the curve of the recessed member a7126. For example, if the curve of the recessed member a7126 is 90°, and the hole a2024 of the coupling part a202 corresponds to the center of the recessed member a7126, the maximum angle of the steering arm a115 rotation may be limited to 45° left or 45° right. If, on the other hand, the curve of the recessed member a7126 is 60°, the maximum angle of the steering arm a115 rotation may be limited to 30° left or 30° right. The steering arm a115 angle restriction may be set at other angles which for example provide easy steering while protecting the rider. Other embodiment, other solutions, other angles or any other mechanisms may be applied without exceeding the scope of the invention.

In one embodiment, the tricycle may be transferred to its second mode by pressing down the connector lever a2081 of the pressure transferring element a208, the guide a2082 may be released from the recessed member a7126 and the hole a2024, and the wheel assembly a108 may be turned, in an angle greater than the limiting angle of recessed member a7126, thereby transferring the tricycle vehicle from the first mode of operation to the second mode of operation.

Figure 20:
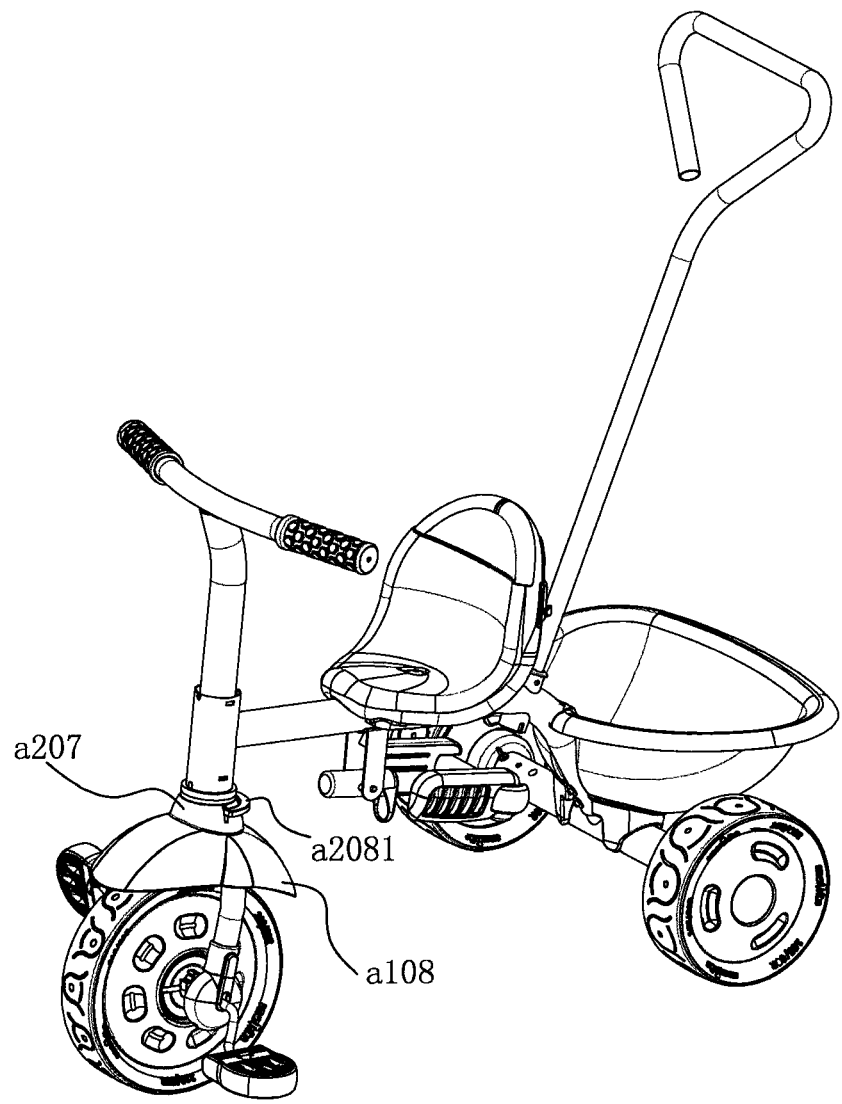
FIG. 20 is a perspective view of a tricycle in its second mode, according to an embodiment of the invention.
Figure 21:
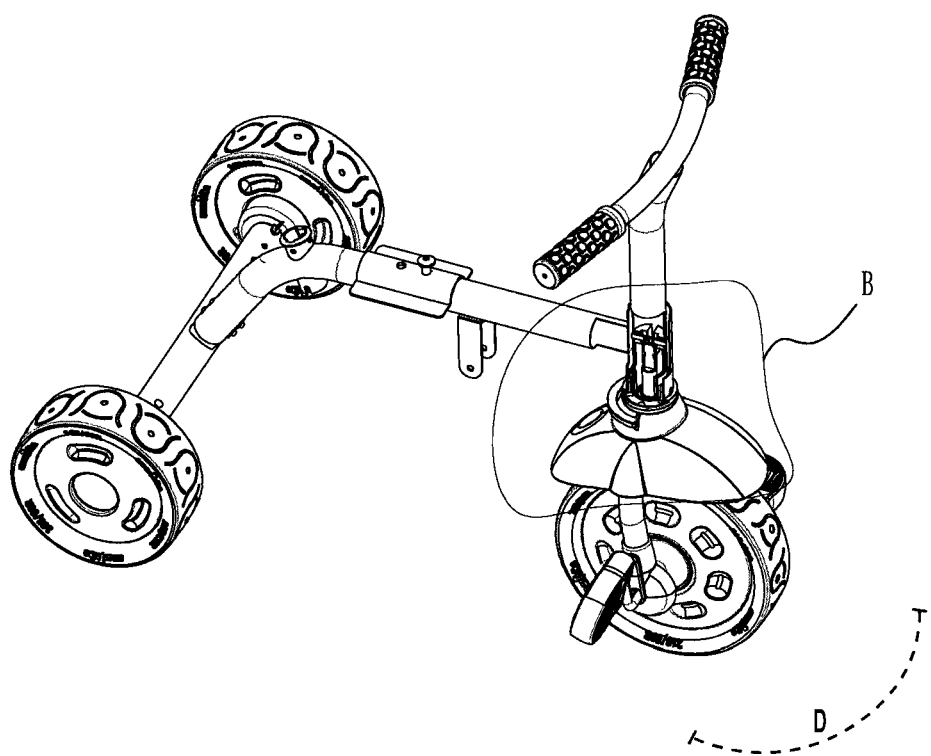
FIG. 21 is a perspective view of a tricycle in its second mode, according to an embodiment of the invention.
Figure 22:
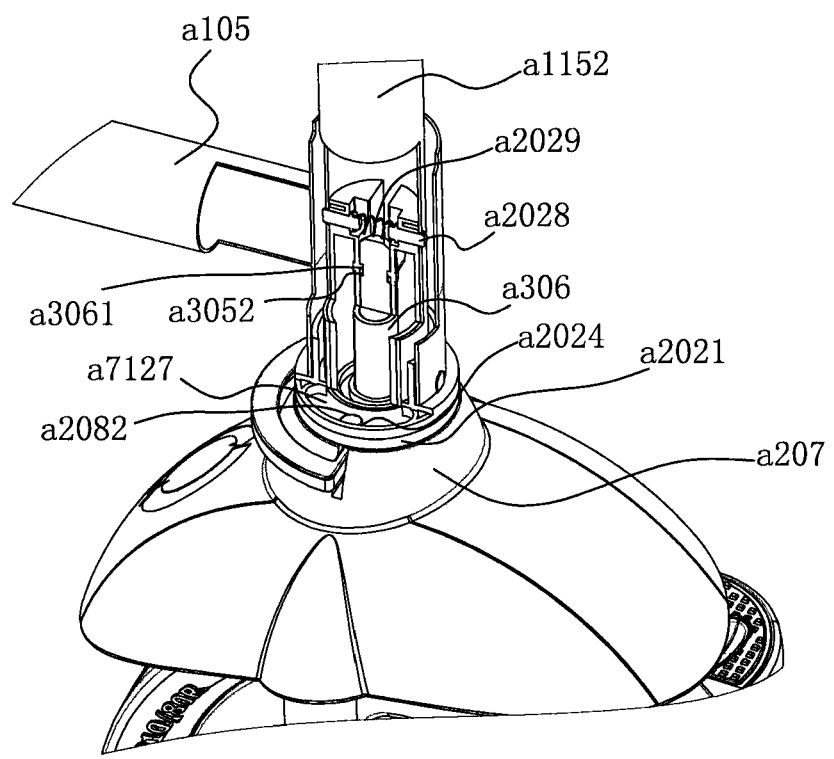
FIG. 22 is an enlarged partial cross-sectional view of a front end of the tricycle in its second mode, according to an embodiment of the invention.

FIGS. 20, 21 and 22, depict the tricycle in its second mode, according to an embodiment of the invention. The connector lever a2081 of the pressure transferring element a208 may be located near the rear part of the head tube, i.e. the connector lever is faced back, and the guide a2082 may be inserted into the groove a2025 of the coupling part a202 and inserted into the recessed member a7127. In this position the rail a1151 of the steering arm a115 is not coupled with the wheel assembly a108 and therefore forces, i.e. the turning left or right, exerted on the rider handle do not substantially affect turning of the front wheel. In an embodiment, the angle of rail a1151 turning is limited to (the curve of) two ends of the recessed member a1727. This is due to the maximum angle of the curve of the recessed member a7127. For example, if the curve of the recessed member a7127 is 90°, and the groove a2025 of coupling mechanism a202 corresponds to the recessed member a7127, the steering arm a115 maximum turning angle is 45° to the left or to the right. In another example, if the curve of the recessed member a7127 is 60°, the steering arm a115 maximum turning angle is 30° to left or to the right. Other embodiments, and other angles of the recessed member 7127 may be applied. Furthermore, the recessed members a7126 and a7127 need not necessarily have the same carved angle, alternatives may exist, where they may have different curved angles, for example, recessed member a7126 may be 90° where recessed member a7127 may be 60°, etc.

By pressing down the connector lever a2081 of the pressure transferring element, the guide a2082 may be released from the recessed member a7127 and the groove a2025, and the wheel assembly may be turned in an angle greater than the limiting angle of recessed member a7127, thereby transferring the tricycle vehicle from the second mode of operation to the first mode of operation.

As described before, there is an offset from the central axis of the stem a305 and the horizontal axle a118 of the front wheel. The offset may be located near the front of the head tube, i.e. faced front, while the guide a2082 is placed in recessed member a7126 via the hole a2044, where the distance from rear wheel axle to front wheel axle may be approximated at 480 mm; whereas the offset may be faced back while the guide a2082 is placed into recessed member a7127 via the groove a2045, and the distance from the rear wheel axle to the front wheel axle may be approximated at 440 mm. When in the first mode of operation, the distance from rear wheel axle to front wheel axle may be typically longer than when in the second mode of operation.

Figure 23:
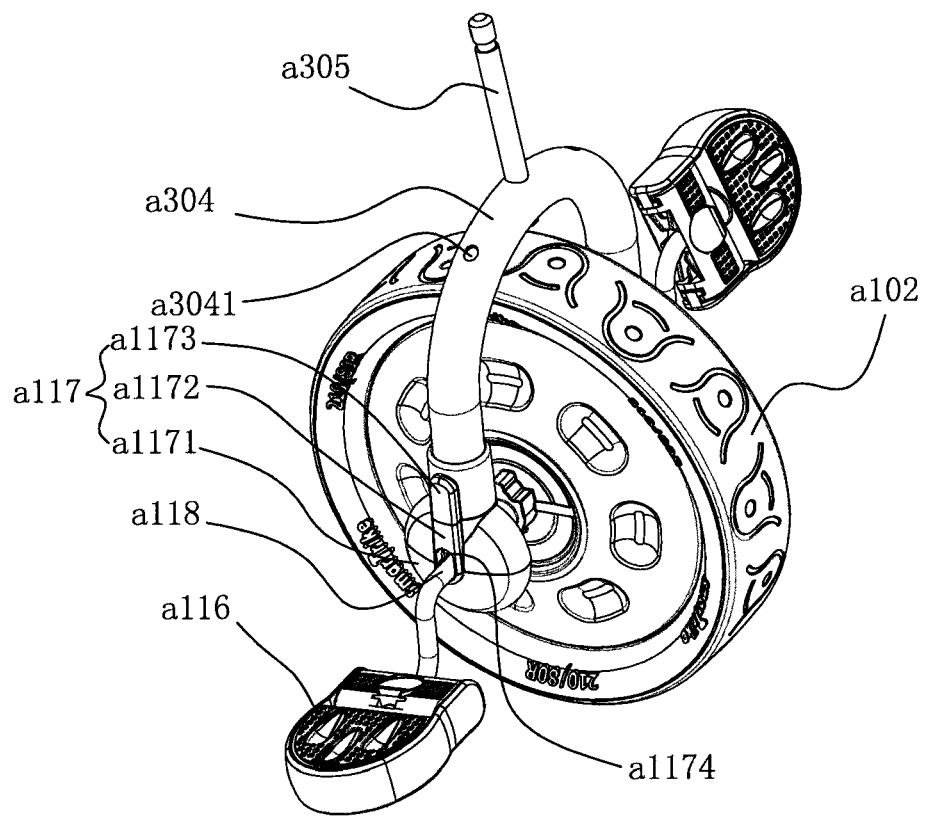
FIG. 23 is a perspective view of a suspension mechanism, according to an embodiment of the invention.
Figure 24:
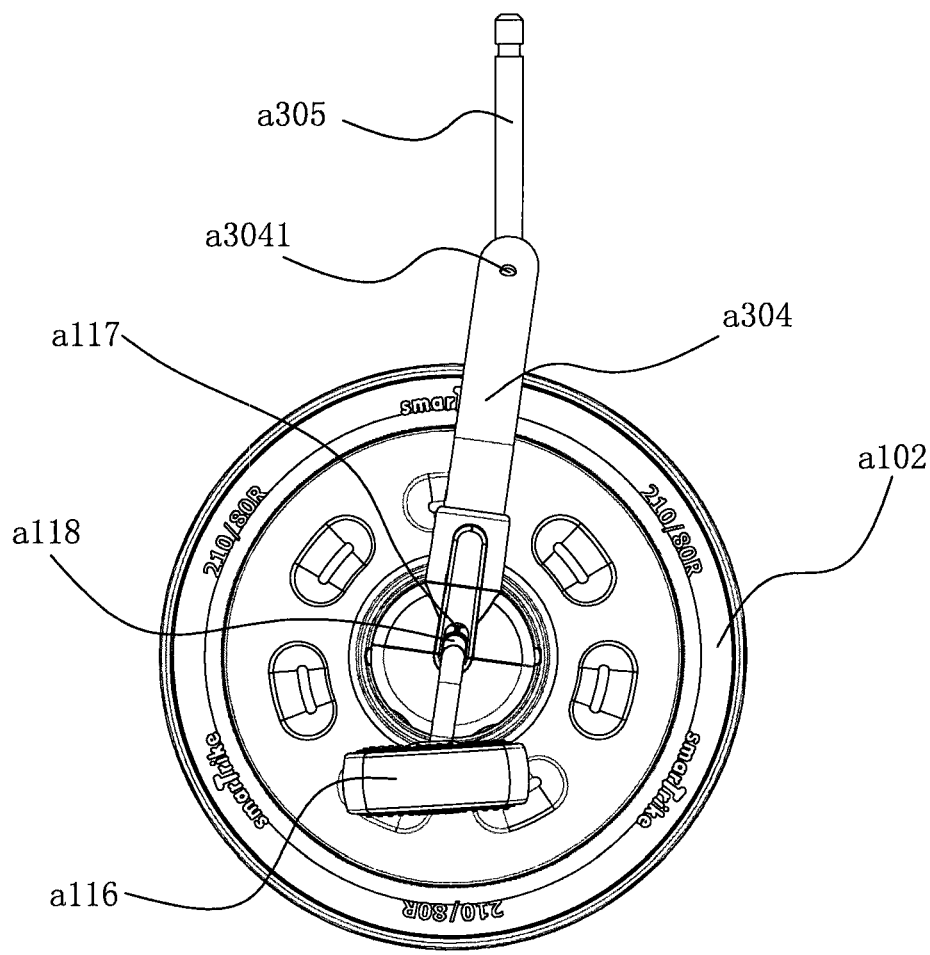
FIG. 24 is a side view of the suspension mechanism, according to an embodiment of the invention.

FIGS. 23 and 24 are views of a suspension mechanism, according to an embodiment of the invention. The suspension mechanism a117 may include a bottom cover a1171, a body a1172 and an upper cover a1173. The bottom cover a1171 may be affixed to the body a1172 using screws snap-ins or any other method, where the upper cover a1173 may be placed or attached to the body a1172. The bottom cover a1173 and the lower part of body a1172 are configured such that the axle a118 of the front wheel a102 may be positioned in the buffer slot a1174.

Figure 25:
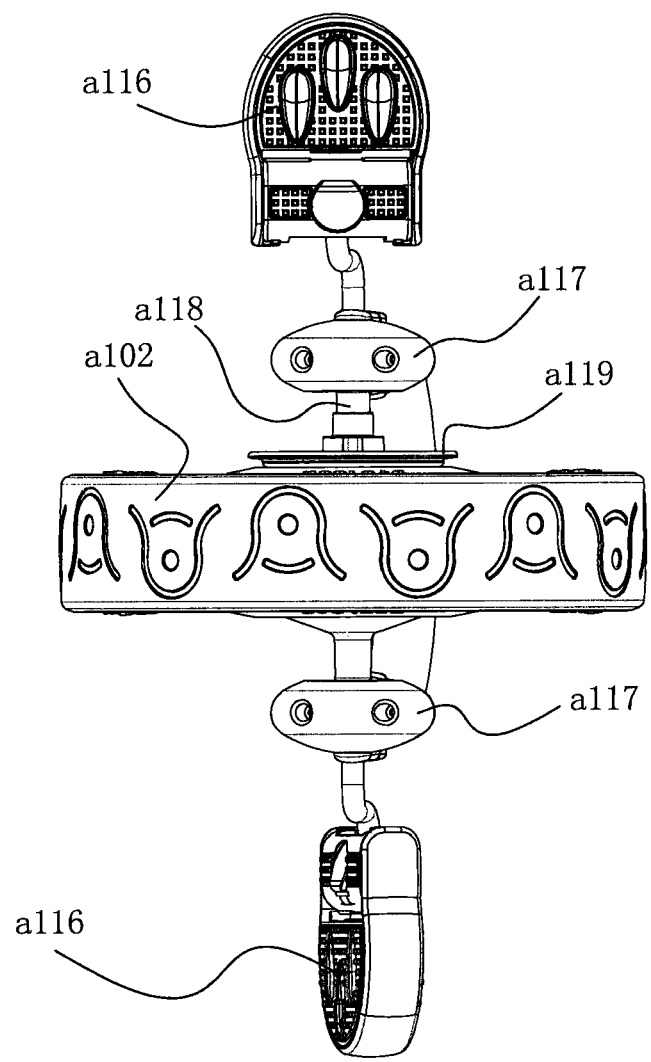
FIG. 25 is a bottom view of a front wheel and its pedals, according to an embodiment of the invention.

FIG. 25 is a diagram bottom up view of the front wheel and its pedals, according to an embodiment of the invention. The front wheel may have a clutch mechanism a119 for coupling/decoupling the pedals a116, and their pedal rod, to the rotation factor of the horizontal axle a118 of the front wheel a102. When the axle a118 is decoupled from the pedals a116 and their rod, the pedaling will not rotate the front wheel. When the rotation factor of the horizontal axle a118 is coupled to the pedals a116 and their rod, the rider may pedal the pedals a116 and rotate the front wheel a102. Hence, when the vehicle is in its first mode, the axle a118 and the pedal a116 are typically coupled by the clutch, whereas when the vehicle is in its second mode, the axle a118 is typically decoupled from the pedal a116 by the clutch.

Figure 26:
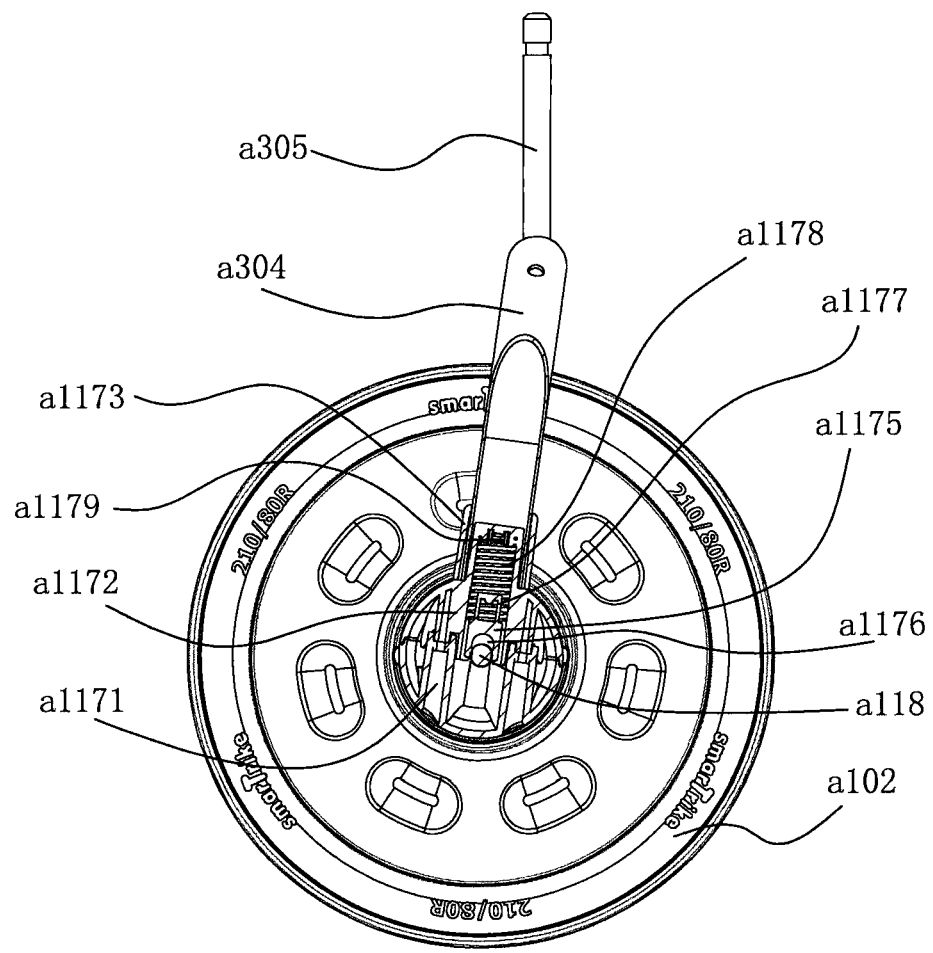
FIG. 26 is a side view of inner parts of a suspension mechanism, according to an embodiment of the invention.

FIG. 26 is a partial cut-away view of the suspension mechanism a117, according to an embodiment of the invention. The suspension mechanism a117 may include a member a1175, configured to pivotally hold the pedal rod of the front wheel a102, and a spring a1178, attached to the member a1175, for exerting a pushing force on the member a1175. In the lower part of the coupling member a1175, a groove a1176 is configured which corresponds to the shape of the pedal rod of the front wheel a102. On the upper part of the member a1175, a pillar a1177 may be configured having a radius slightly smaller than the radius of the spring a1178 for affixing the spring a1178 over member a1175. The body a1172 may be affixed to the fork a304 by a bolt a1179, or any other known mechanism.

In other embodiments, the pillar a1177 may not exist, instead, the element a1175 may have a chamber structure, on two opposite side of the member a1175 where configured guiding grooves, and two guiding trails may be configured inside of the body a1172 to correspond to the grooves.

Figure 27:
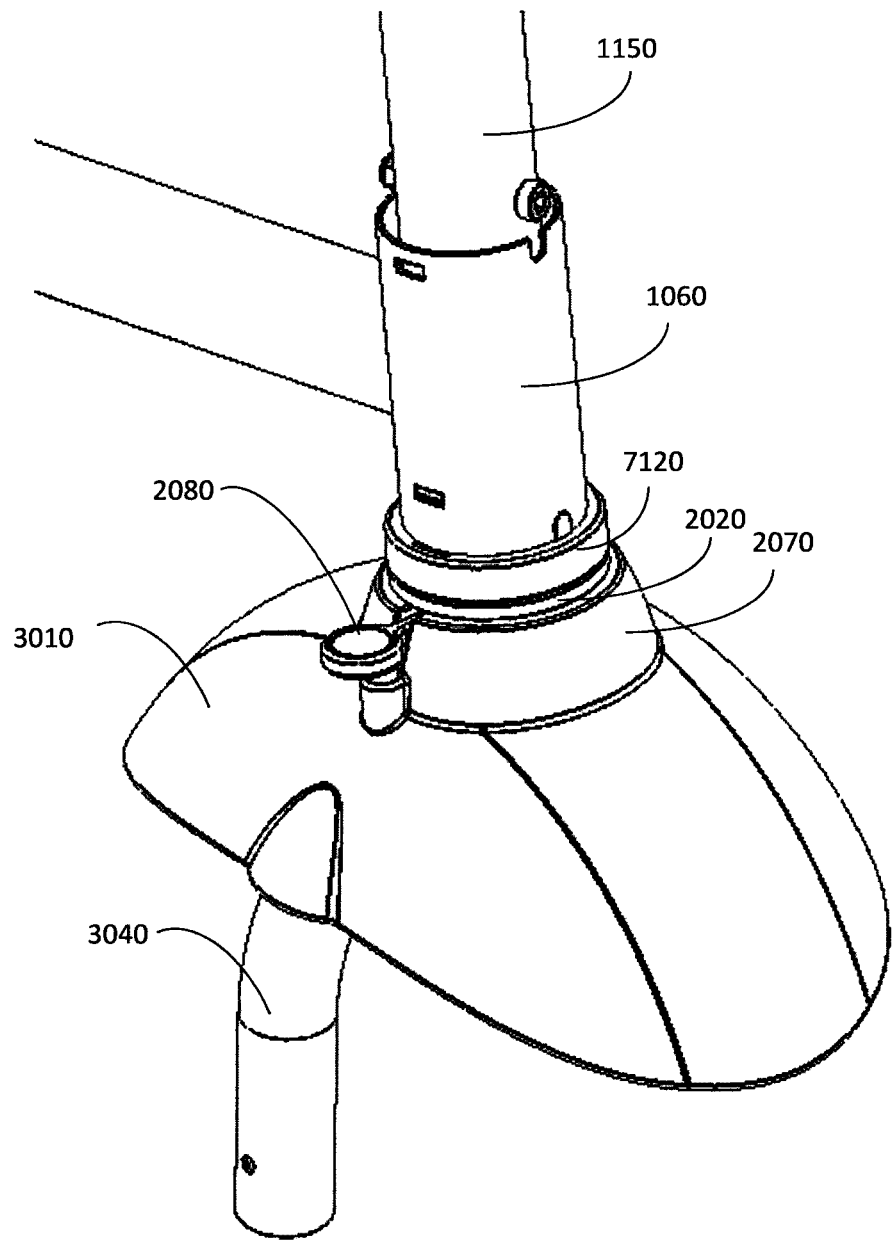
FIG. 27 is a perspective view of a portion of a front wheel assembly, according to another embodiment of the invention.

FIG. 27 is a detailed view of a portion of the front wheel assembly, according to another embodiment of the invention. Similarly to the described in relations to FIG. 15, the wheel assembly may comprise a fork 3040 and a mudguard 3010 with a supporting structure 2070. The supporting structure 2070 and mud-shield 3010 may be made of one piece using the injection method or any other known method. Alternatively, other embodiments may be used. For example, the support structure 2070 may be affixed to the mudguard 3010. The support structure 2070 may include a cone extending from the top of the mudguard 3010. The front wheel assembly may be held and restricted by the parts 2020, 7120, and 1060, which may function similarly to parts a2021, a7121, and a106 respectively as described in relations to FIGS. 13-15. In this embodiment the pressure transferring element 2080 may be a button which extends from the side of the mudguard, and may be pressed for turning the front wheel from the configuration where the stem axis leads the front wheel axis to a configuration where the stem axis trails the front wheel axis or vise-versa, e.g. when the tricycle is transferred from its first mode of operation to its second mode of operation. Once the front wheel has been turned the pressure transferring element 2080 may be released where it can slide into one of the grooves as described in relations to FIG. 16.

Figure 28:
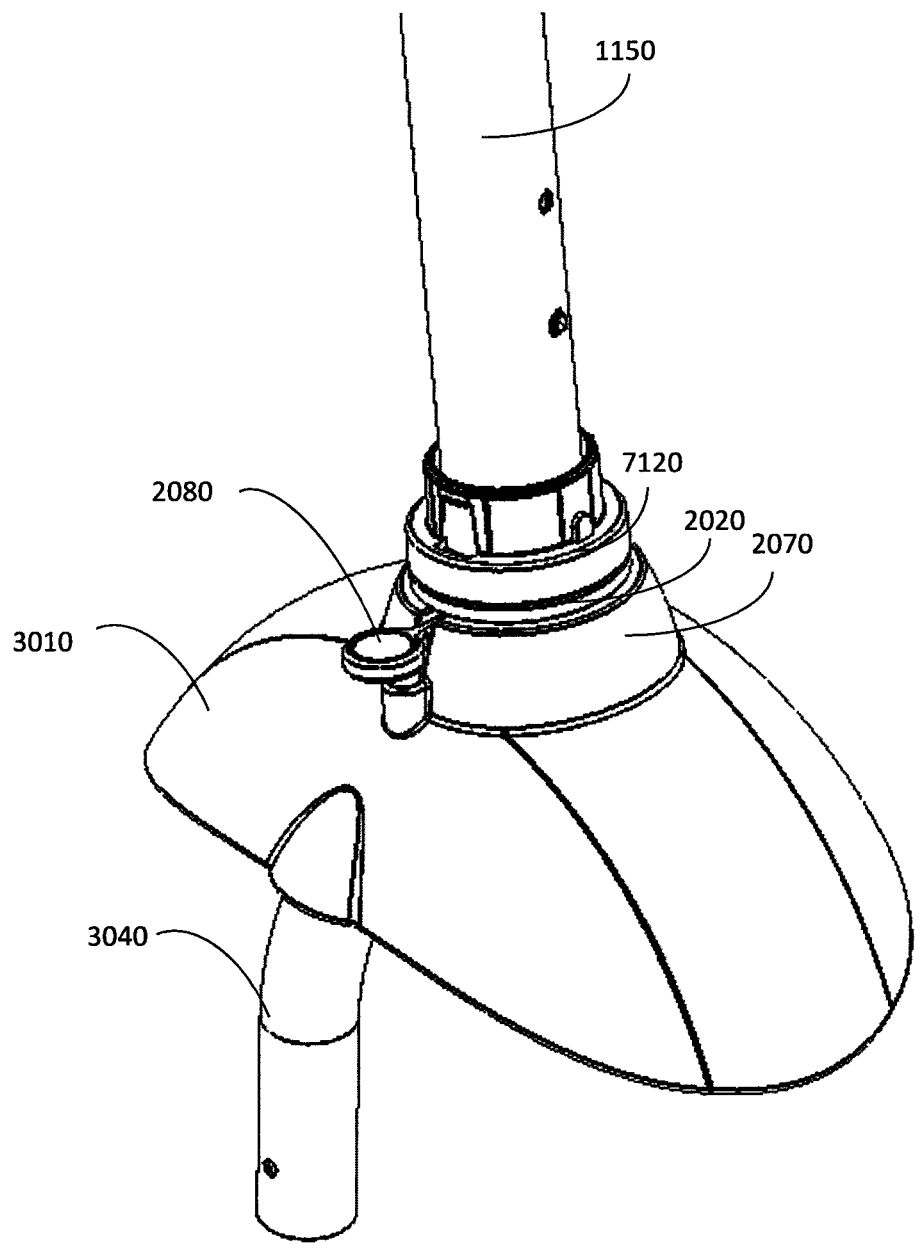
FIG. 28 is a perspective view of parts of a front wheel assembly, according to an embodiment of the invention.
Figure 29:
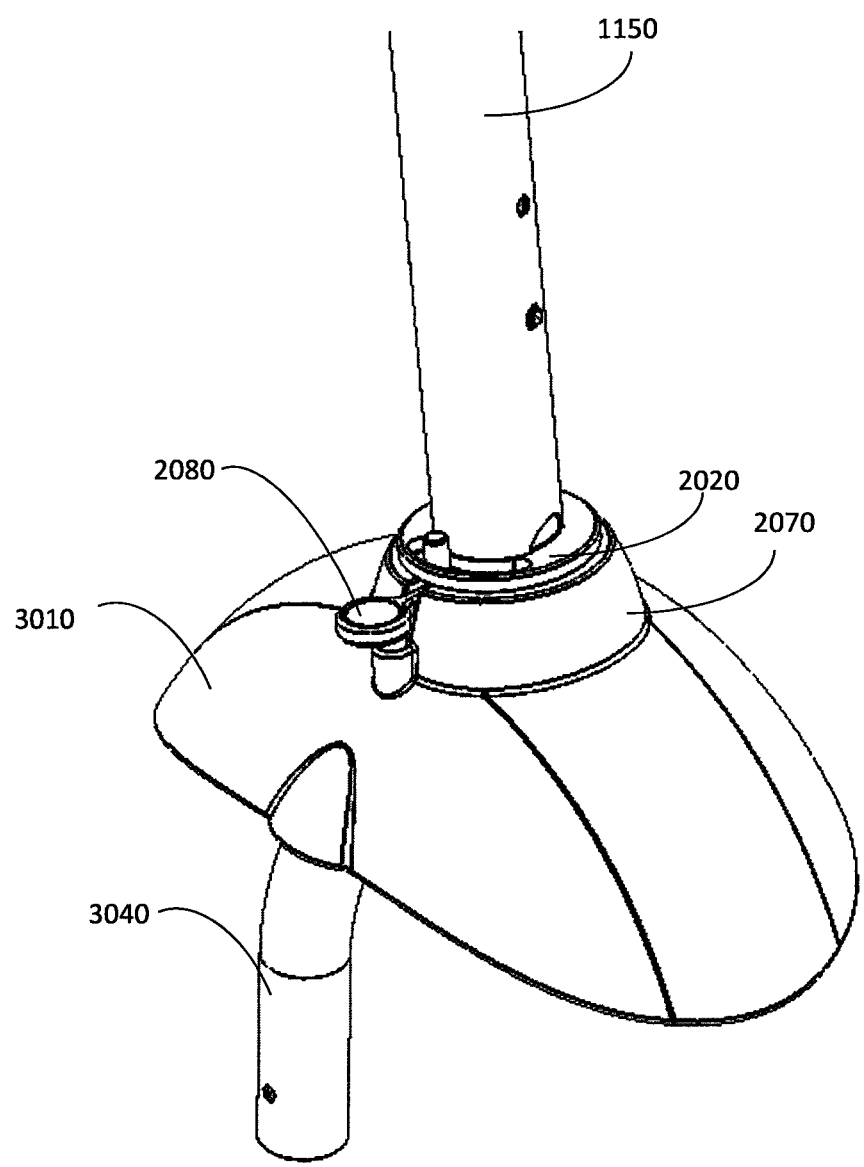
FIG. 29 is another perspective view of parts of a front wheel assembly, according to an embodiment of the invention.
Figure 30:
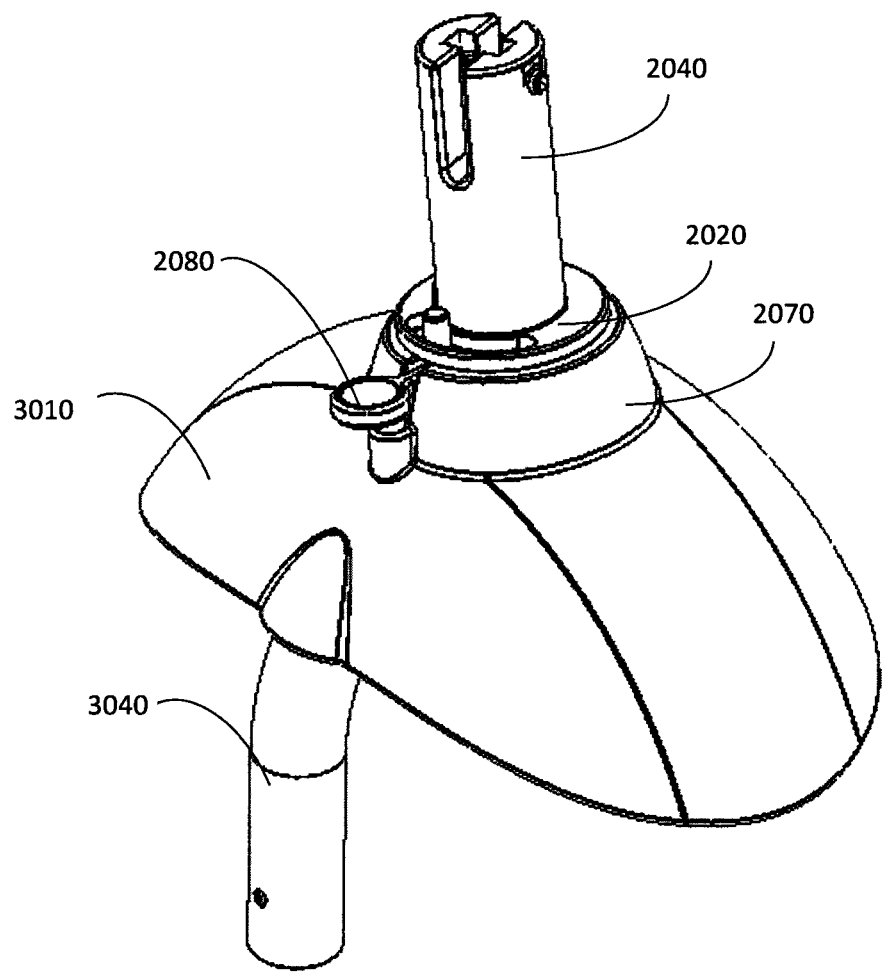
FIG. 30 is another perspective view of parts of the front wheel assembly, according to an embodiment of the invention.
Figure 31:
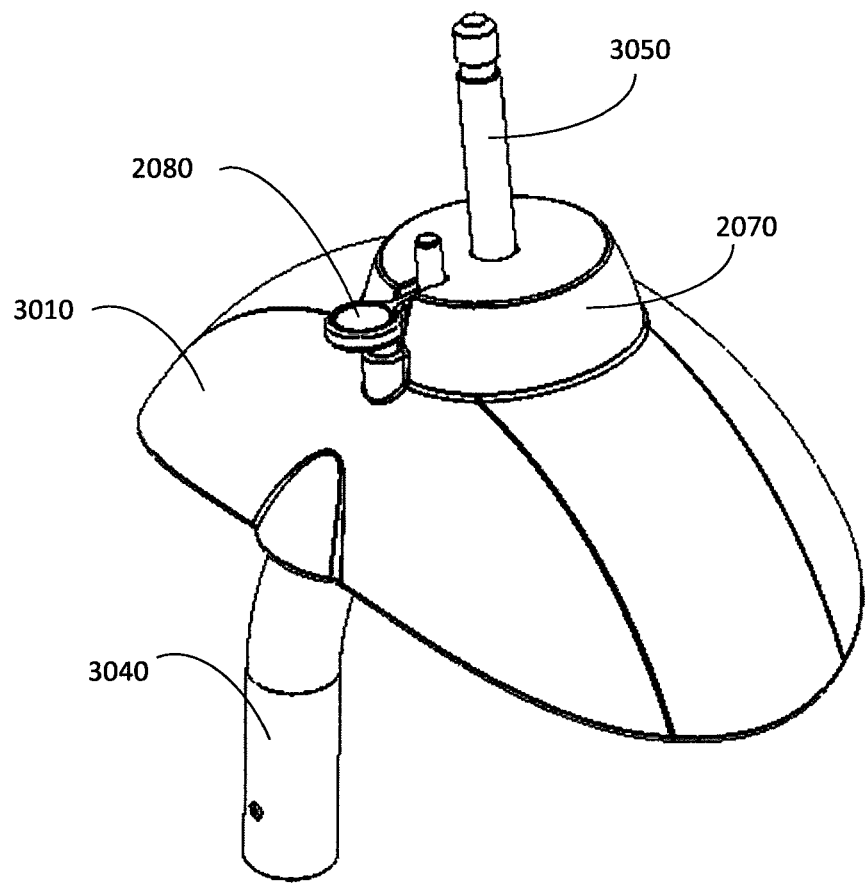
FIG. 31 is a further perspective view of parts of the front wheel assembly, according to an embodiment of the invention.

FIGS. 28, 29, 30 and 31 are further detailed views of a front wheel assembly, according to an embodiment of the invention. FIG. 28 depicts the front wheel assembly of FIG. 27 with the head tube 1060 omitted. Similarly, FIG. 29 depicts the front wheel assembly of FIG. 28 with the restricting element 7120 omitted. FIG. 30 depicts the front wheel assembly of FIG. 29 with the rail 1150 of the rider handle omitted. Similarly, FIG. 31 depicts the front wheel assembly of FIG. 30 with the coupling part 2040 omitted. As depicted, the stem 3050 which is connected to the fork 3040 may slide through the hole of supporting structure 2070.

Figure 32:
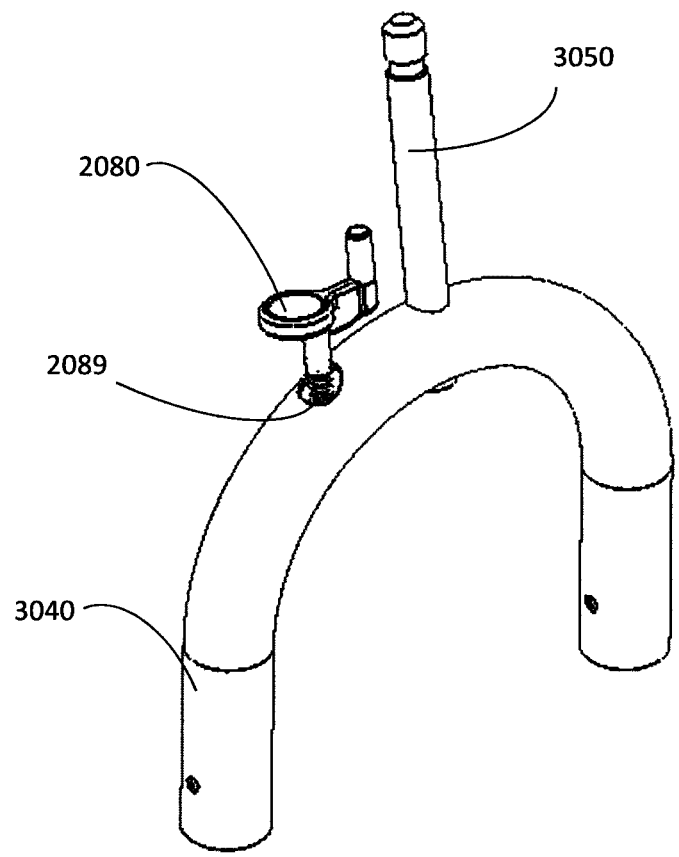
FIG. 32 is yet another perspective view of parts the front wheel assembly, according to an embodiment of the invention.

FIG. 32 is yet a further detailed view of the front wheel assembly, according to an embodiment of the invention. FIG. 32 depicts the front wheel assembly of FIG. 31 with the support structure 2070 and mudguard 3010 omitted. As depicted the pressure transferring element 2080 may be held by the spring 2089 and may be affixed under the pressure transferring element 2080 for pushing upwards the pressure transferring element 2080, thereby restricting the turning angle of the front wheel. In an embodiment, the pressure transferring element 2080 is not fixed in its place by any connecting technique, such as screws or glue, but is held in place by spring 2089 which presses it towards the top of the supporting structure 2070.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the invention or exceeding the scope of claims.

What is claimed is:

1. A tricycle, comprising:
   a frame;
   a pair of rear wheels configured for rotatable connection to one side of the frame;
   a handlebar configured for mounting on another side of the frame;
   a fork configured for connection to the handlebar to enable force exerted on the handlebar to turn the fork;
   a front wheel configured for rotatable connection to the fork;
   a pedal rod configured to extend through the front wheel for supporting pedals to enable a rider to rotate the front wheel;
   a spring interposed between the pedal rod and a connection on the fork for maintaining a portion of the fork at a variable spaced-apart distance from the pedal rod and for enabling a distance between the pedal rod and the portion of the fork to vary as the rider pedals the front wheel; and
   a housing covering at least a portion of the spring and extending toward the pedal rod, wherein the housing includes a slot therein through which the pedal rod is configured to pass, the slot being sized so that as the distance between the pedal rod and the portion of the fork varies, the rod is enabled to move up and down within the slot.

2. A tricycle, comprising:
   a frame:
   a pair of rear wheels configured for rotatable connection to one side of the frame;
   a handlebar configured for mounting on another side of the frame;
   a fork configured for connection to the handlebar to enable force exerted on the handlebar to turn the fork;
   a front wheel configured for rotatable connection to the fork;
   a pedal rod configured to extend through the front wheel for supporting pedals to enable a rider to rotate the front wheel;
   a spring interposed between the pedal rod and a connection on the fork for maintaining a portion of the fork at a variable spaced-apart distance from the pedal rod and for enabling a distance between the pedal rod and the portion of the fork to vary as the rider pedals the front wheel; and
   a coupling member interposed between the pedal rod and the spring, wherein the coupling member includes a U-shaped groove therein for rotatably receiving the pedal rod and an opposing end for engaging the spring.

3. The tricycle of claim 2, wherein the coupling member is made of plastic.

4. The tricycle of claim 1, wherein the spring is arranged to absorb shock between the handlebar and the pedals.

5. The tricycle of claim 3, wherein the coupling member includes a first portion in an area of the groove and a second portion in an area of the spring, and wherein the first portion has a dimension greater than a dimension of the second portion.

6. The tricycle of claim 1, wherein the connection on the fork includes a pin that secures the fork over the upper end of the spring.

7. The tricycle of claim 2, wherein the coupling member is configured to orient the spring above the pedal rod.

8. The tricycle of claim 2, wherein the coupling member includes a pillar on an upper end thereof, the pillar having a radius smaller than a radius of the spring.

9. The tricycle of claim 2, wherein the coupling member includes a chamber and guiding trails.

10. The tricycle of claim 1, where the spring is viewable.

11. The tricycle of claim 1, wherein the spring is arranged to absorb shock between the frame and the front wheel.

* * * * *